United States Patent
Shimizu

(10) Patent No.: US 7,752,922 B2
(45) Date of Patent: Jul. 13, 2010

(54) MAGNETOSTRICTIVE TORQUE SENSOR AND METHOD FOR MANUFACTURING SAME

(75) Inventor: Yasuo Shimizu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/080,396

(22) Filed: Apr. 2, 2008

(65) Prior Publication Data

US 2008/0245161 A1 Oct. 9, 2008

(30) Foreign Application Priority Data

Apr. 3, 2007 (JP) ............................. 2007-097870

(51) Int. Cl.
*G01L 3/00* (2006.01)

(52) U.S. Cl. ............................. 73/862.333; 73/862.325; 73/862.335

(58) Field of Classification Search .................... 73/862.331–862.336
See application file for complete search history.

(56) References Cited

U.S. PATENT DOCUMENTS

| | | | | |
|---|---|---|---|---|
| 4,899,598 A | * | 2/1990 | Gumaste et al. | 73/862.335 |
| 4,906,306 A | | 3/1990 | Araki et al. | |
| 5,022,275 A | | 6/1991 | Satoh et al. | |
| 5,105,667 A | | 4/1992 | Satoh et al. | |
| 5,142,919 A | | 9/1992 | Satoh et al. | |
| 5,193,267 A | | 3/1993 | Satoh et al. | |
| 5,520,059 A | * | 5/1996 | Garshelis | 73/862.335 |
| 5,850,045 A | * | 12/1998 | Harada et al. | 73/862.333 |
| 5,880,379 A | | 3/1999 | Tanaka et al. | |
| 6,422,095 B1 | | 7/2002 | Shimizu et al. | |
| 6,574,853 B2 | | 6/2003 | Shinoura | |
| 6,595,074 B2 | * | 7/2003 | Shimizu et al. | 73/862.333 |
| 7,013,741 B2 | | 3/2006 | Nakamura et al. | |
| 7,127,797 B1 | * | 10/2006 | Kilmartin et al. | 29/602.1 |
| 2002/0078765 A1 | * | 6/2002 | Shinoura | 73/862.333 |
| 2007/0068726 A1 | | 3/2007 | Shimizu | |
| 2007/0089538 A1 | * | 4/2007 | Kashimura et al. | 73/862.331 |
| 2007/0193372 A1 | | 8/2007 | Shimizu | |

FOREIGN PATENT DOCUMENTS

| | | |
|---|---|---|
| EP | 0 162 957 A1 | 12/1985 |
| EP | 1 217 351 A1 | 6/2002 |

(Continued)

OTHER PUBLICATIONS

Rabinkin, Anatol. "Curie Temperature of METGLAS Magnetic Alloys Measured by Different Techniques." IEEE Transactions on Magnetics, vol. Mag-23, No. 6, Nov. 1987, pp. 3874-3877.

*Primary Examiner*—Lisa M Caputo
*Assistant Examiner*—Jonathan Dunlap
(74) *Attorney, Agent, or Firm*—Carrier Blackman & Associates P.C.; Joseph P. Carrier; William D. Blackman

(57) ABSTRACT

A magnetostrictive torque sensor for detecting a torque comprises an operating shaft, a first hollow shaft, a second hollow shaft, a first magnetostrictive film, and a second magnetostrictive film. Torque acts on the operating shaft from the outside. The first and second hollow shafts are fitted and fixed separately on the operating shaft. The first magnetostrictive film is formed on an external peripheral surface of the first hollow shaft while the second magnetostrictive film is formed on an external peripheral surface of the second hollow shaft.

15 Claims, 14 Drawing Sheets

FOREIGN PATENT DOCUMENTS

| | | |
|---|---|---|
| JP | 60-042628 | 3/1985 |
| JP | 01260332 A | 10/1989 |
| JP | 04329327 A * | 11/1992 |
| JP | 06174567 A | 6/1994 |
| JP | 09-159551 | 6/1997 |
| JP | 2001-133337 | 5/2001 |
| JP | 2004-309184 | 11/2004 |
| JP | 2004-333449 | 11/2004 |
| JP | 2004-340744 | 12/2004 |
| JP | 2006349465 A | 12/2006 |

* cited by examiner

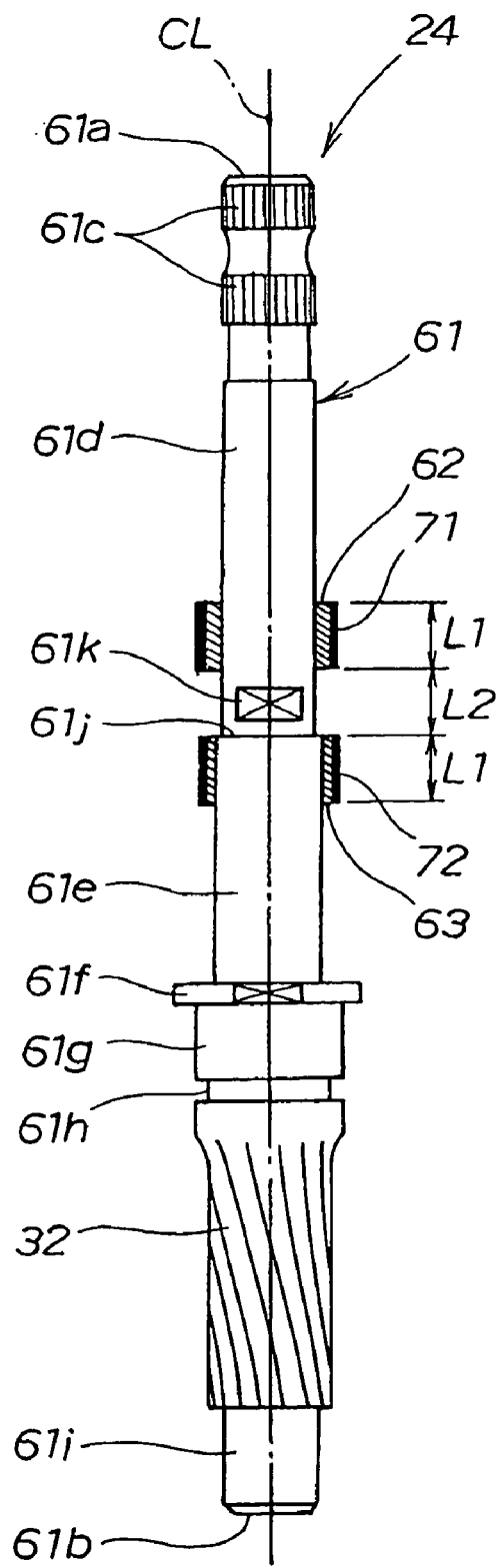
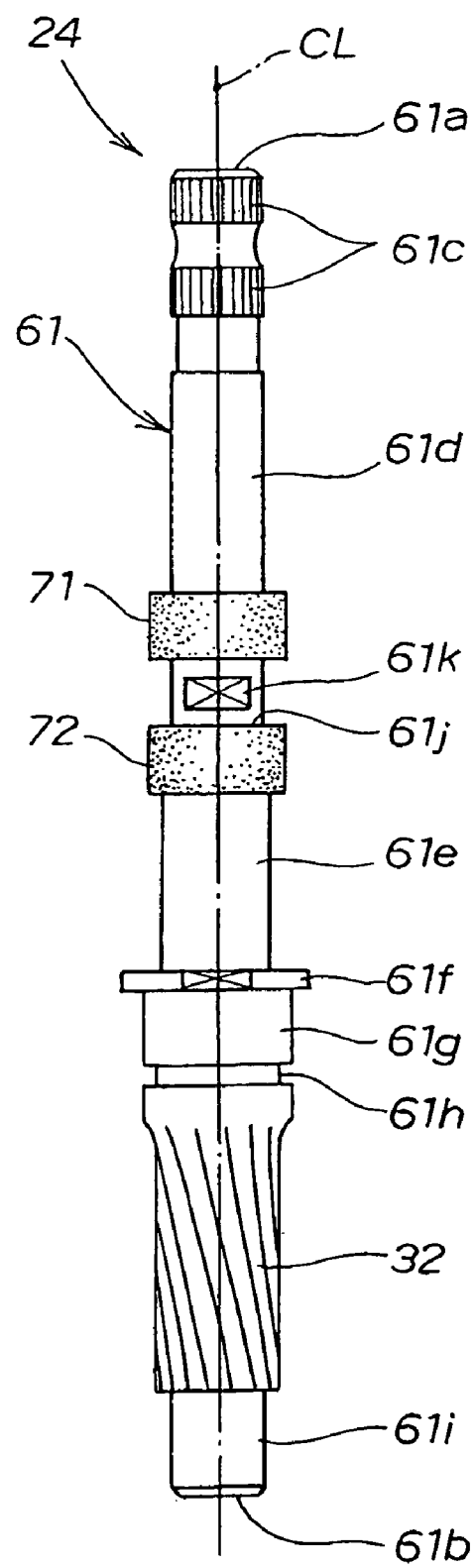

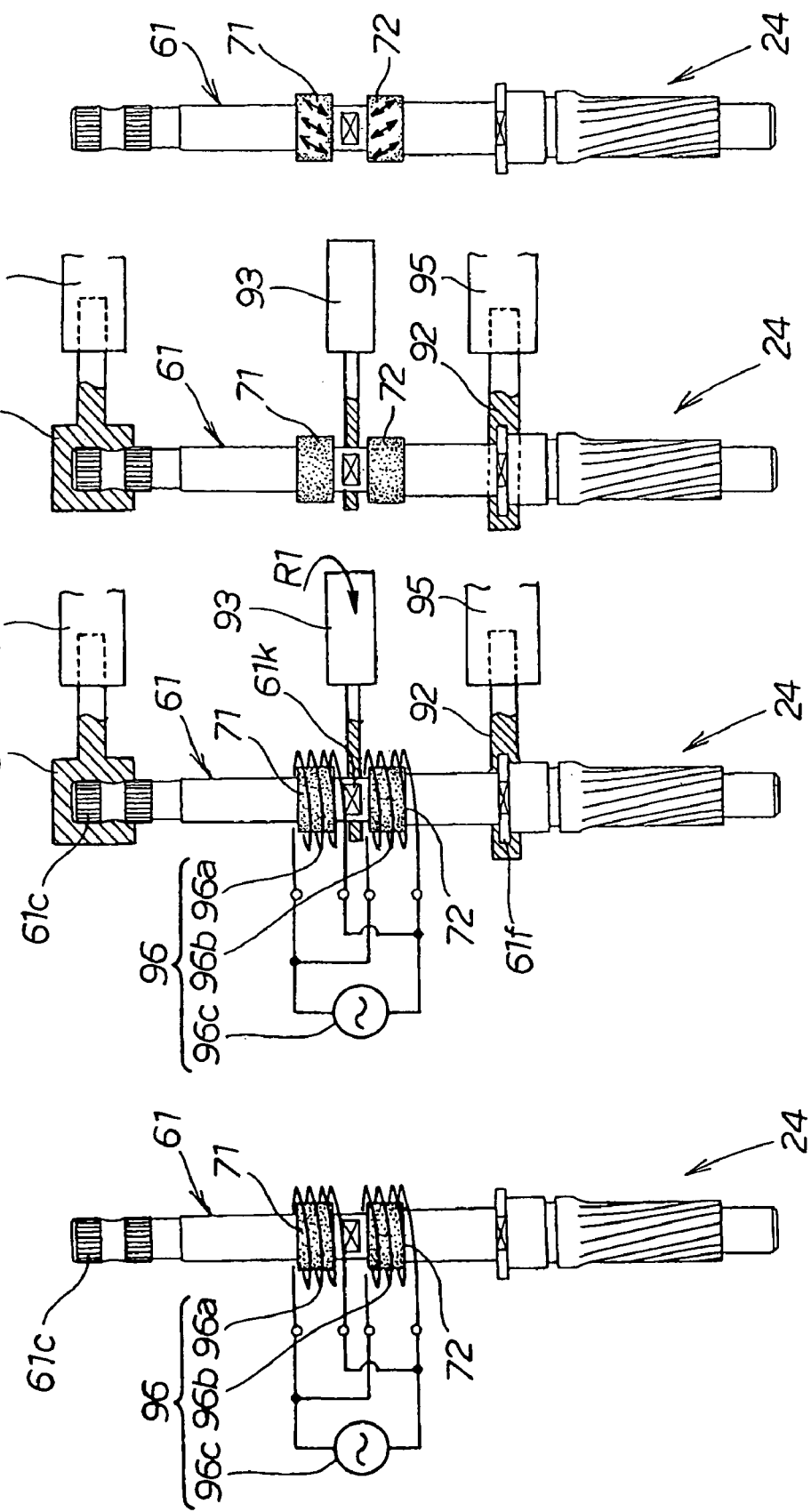

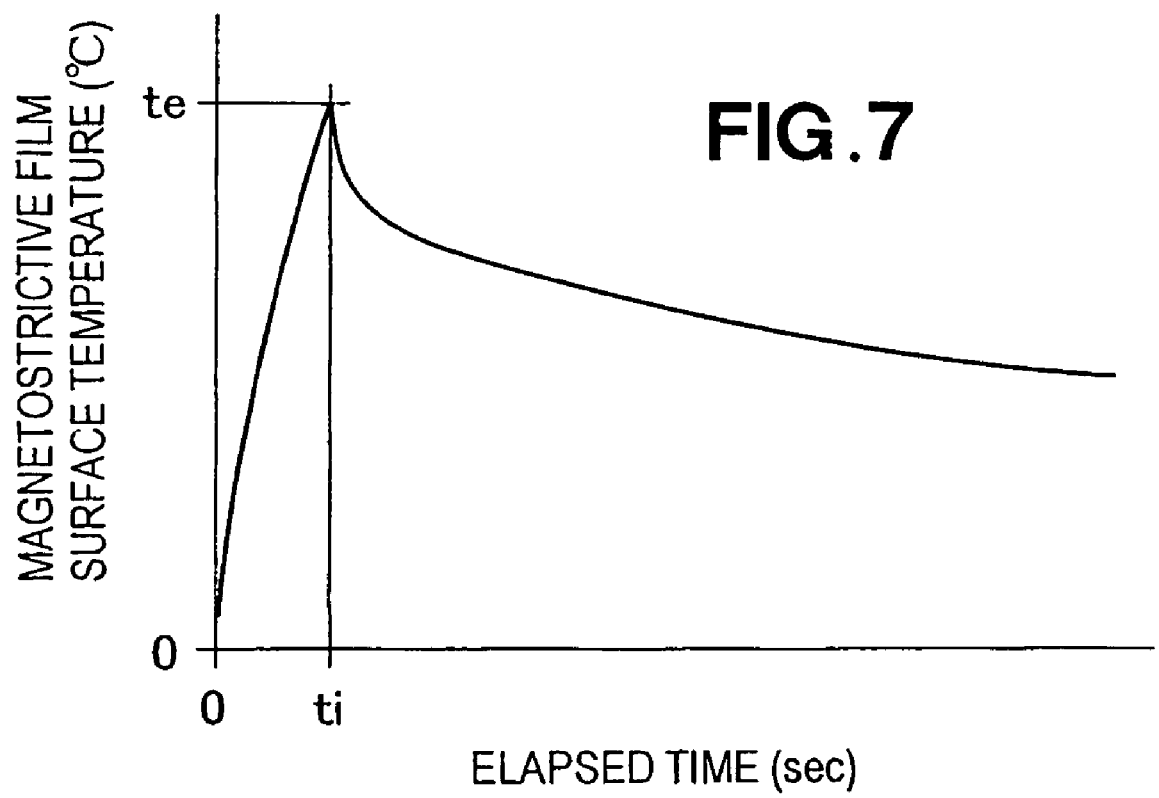

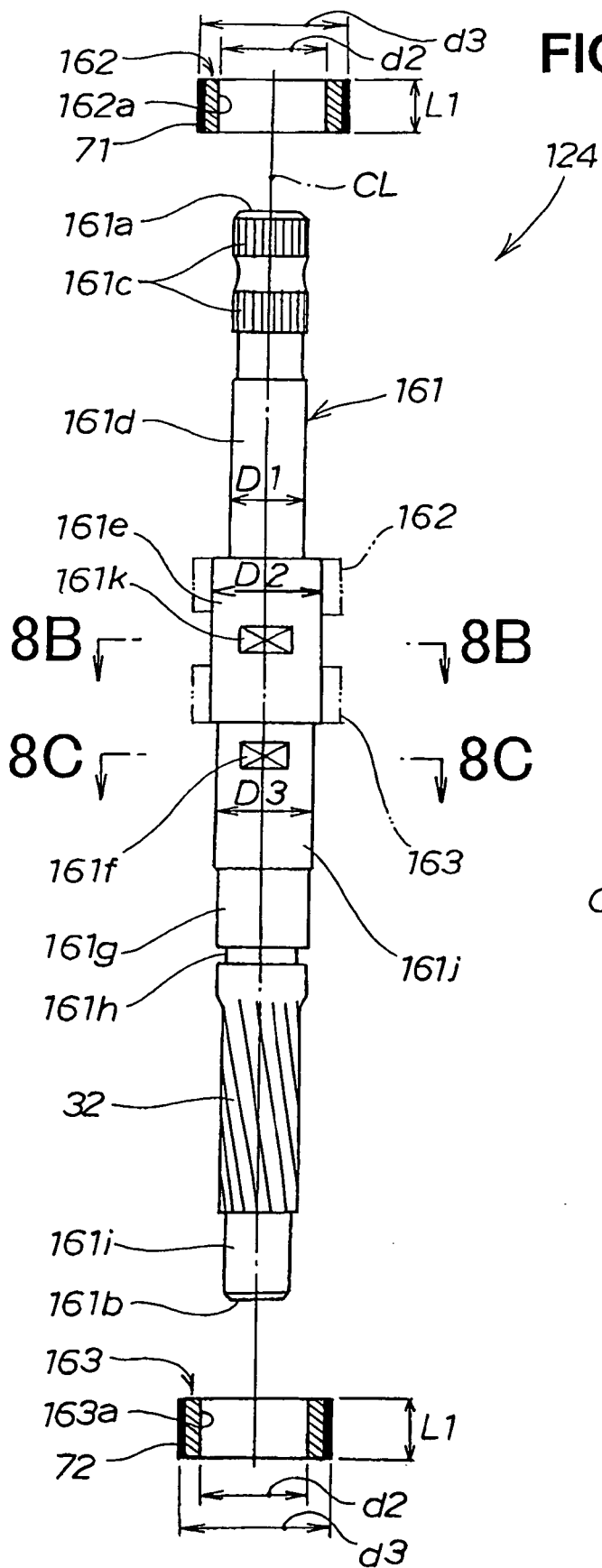
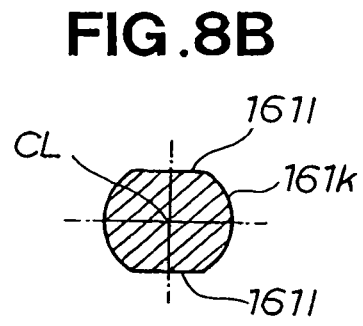
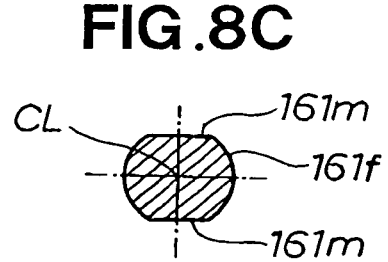
FIG. 8A
FIG. 8B
FIG. 8C

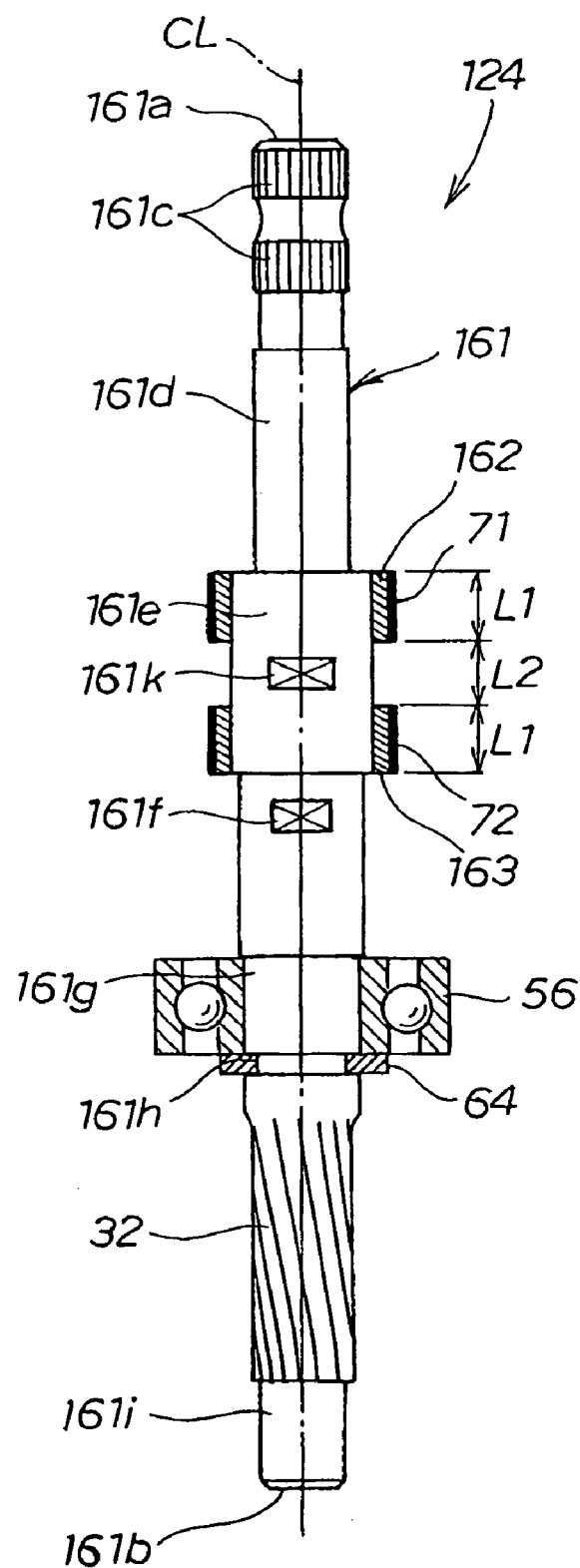
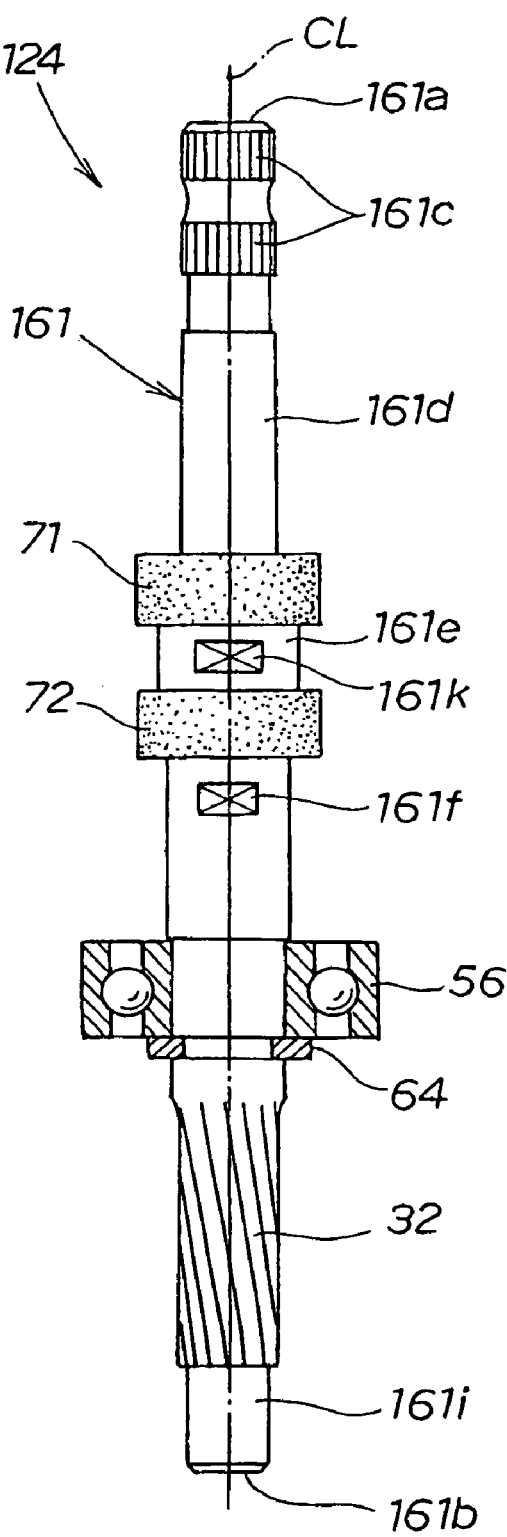

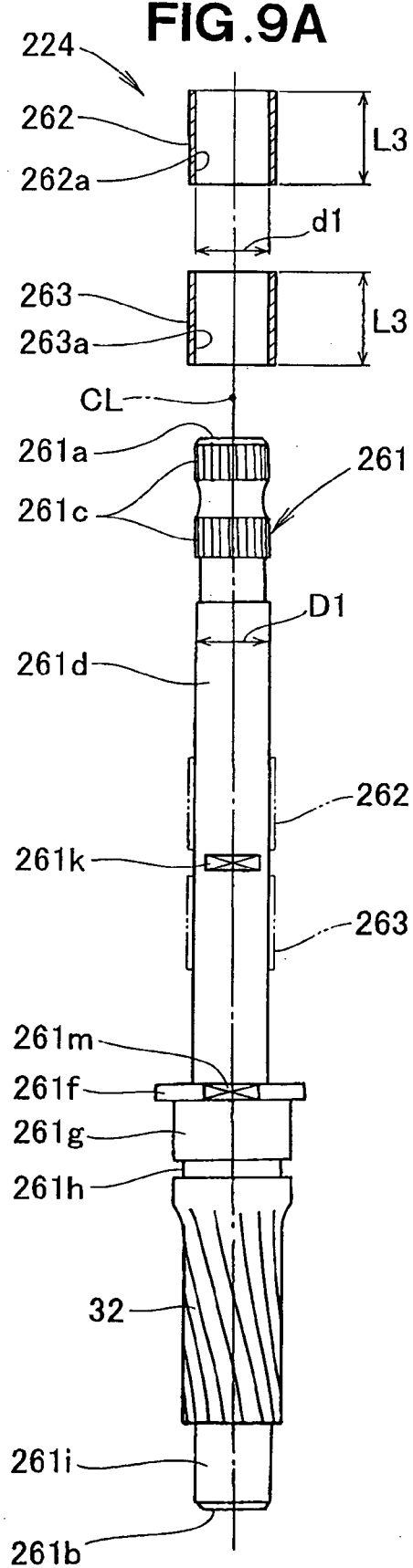
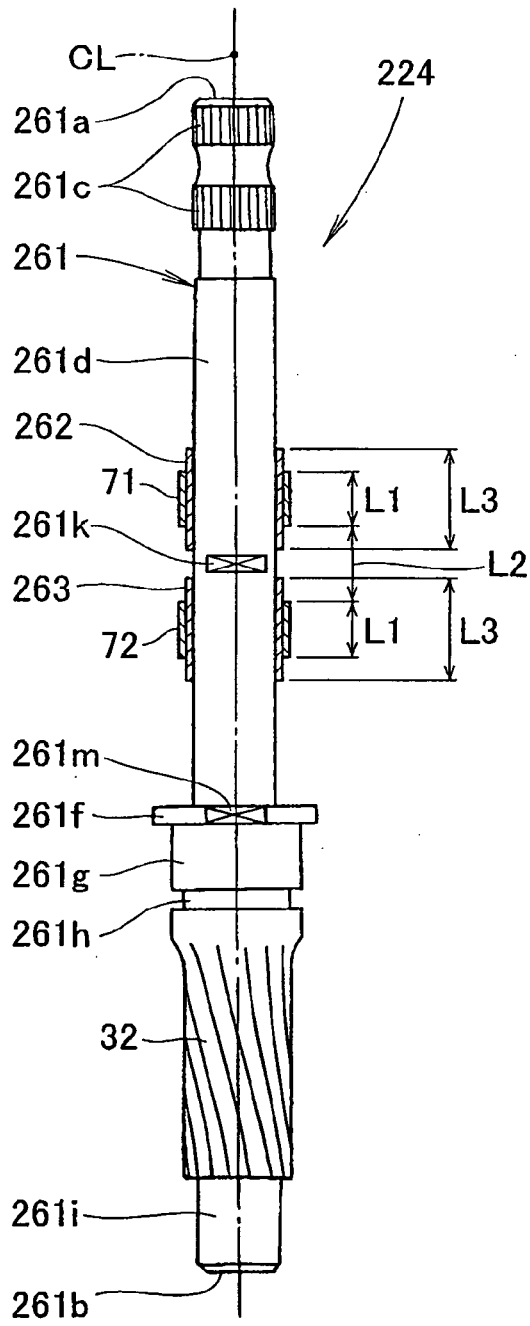
FIG.9A
FIG.9B

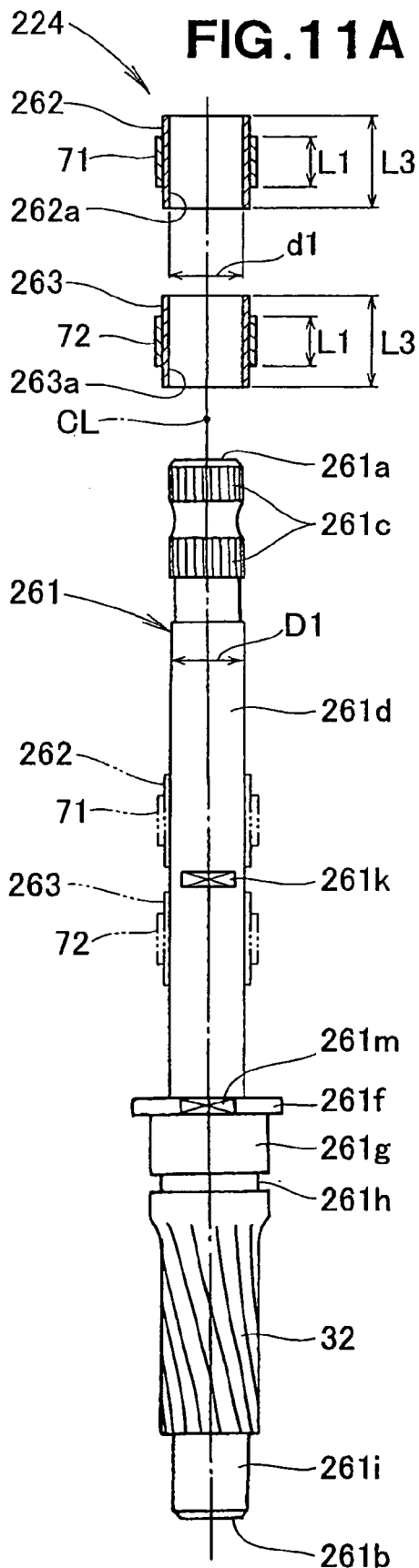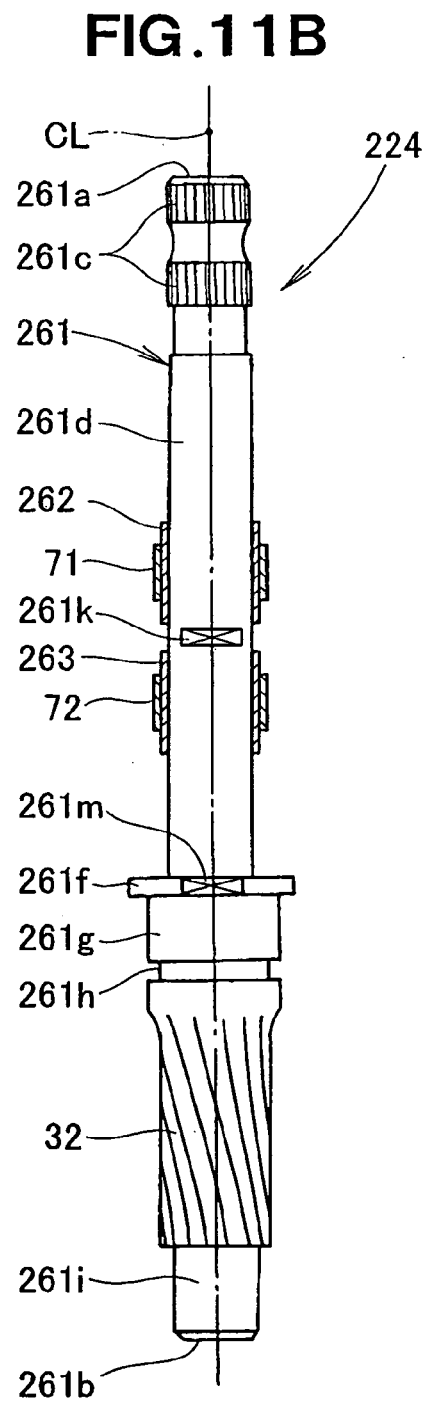

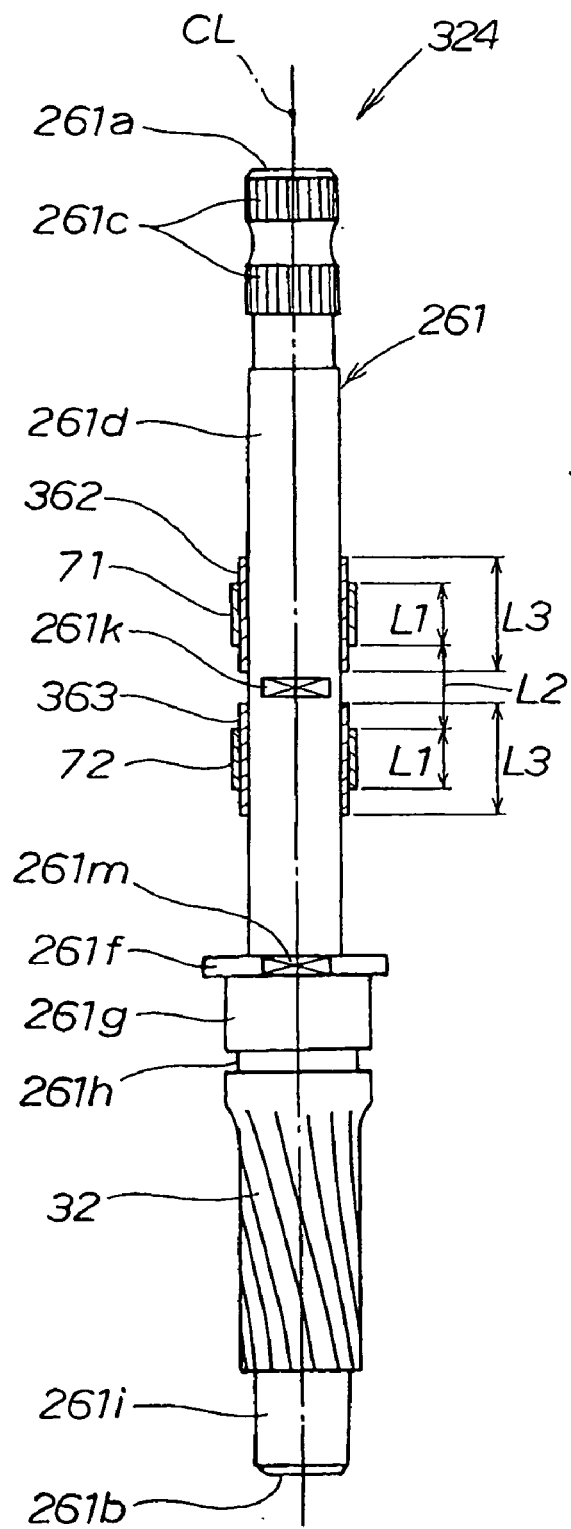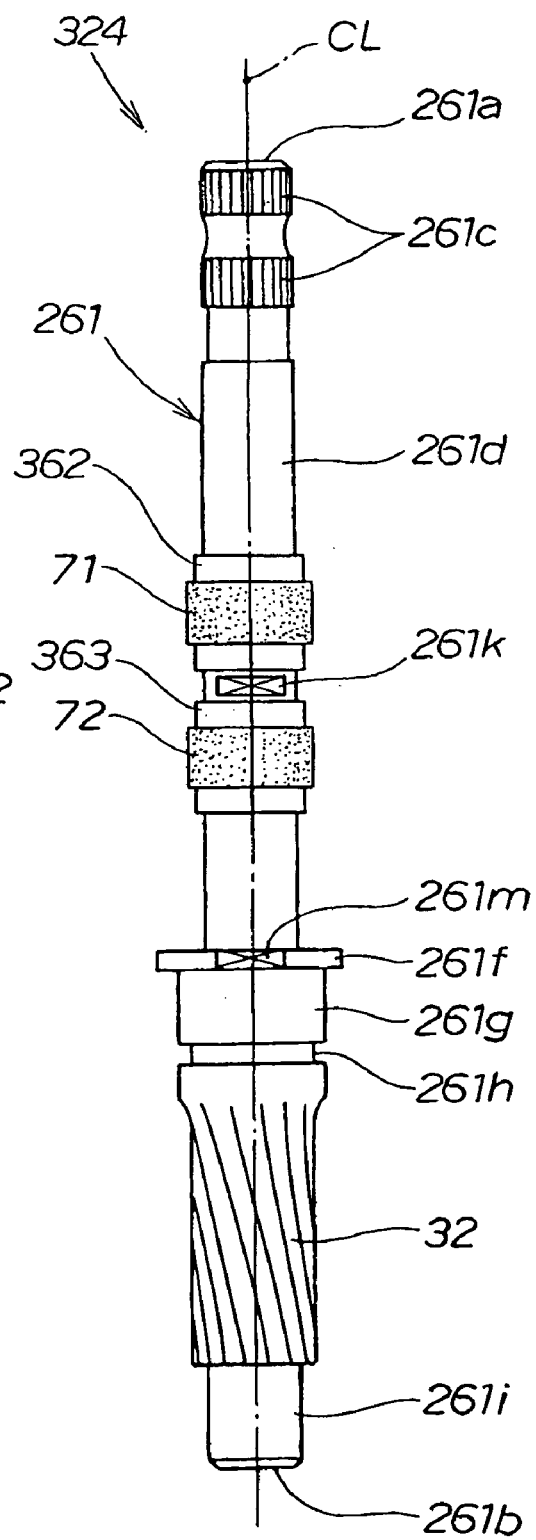

MAGNETOSTRICTIVE TORQUE SENSOR AND METHOD FOR MANUFACTURING SAME

FIELD OF THE INVENTION

The present invention relates to a magnetostrictive torque sensor for detecting a torque, and to a method for manufacturing the same.

BACKGROUND OF THE INVENTION

There are many types of torque sensors for detecting a torque that are used in rotating shafts. Magnetostrictive torque sensors that have high precision and a comparatively simple configuration have recently been disclosed in JP-A-2001-133337, JP-A-2004-309184, JP-A-2004-333449, JP-A-2004-340744.

The magnetostrictive torque sensors disclosed in JP-A-2001-133337, JP-A-2004-309184, JP-A-2004-0333449, JP-A-2004-340744 are provided to electric power steering apparatuses for vehicles, and are used to detect a steering torque transferred from a steering wheel to a torque transmission shaft (rotating shaft). A magnetostrictive film is formed on an external peripheral surface of the torque transmission shaft. The magnetostrictive torque sensor makes it possible to detect a steering torque by using an electric coil and a magnetostriction sensor circuit to detect changes in magnetostriction that occur in the magnetostrictive film in accordance with the steering torque.

The steering torque generated by the steering wheel is transferred to the steered vehicle wheels via the torque transmission shaft, a rack and pinion mechanism, and a rack shaft. Thus, a magnetostrictive film is formed on the external peripheral surface of the torque transmission shaft, and a pinion (torque transmission portion) of the rack and pinion mechanism is formed at the end of the shaft.

There is a need for the ability to steer an automobile even when the engine has not been started up. In this state, the steering torque for steering the steered vehicle wheels is greater than during usual steering. The greater steering torque is transferred from the torque transmission shaft to the rack shaft via the rack and pinion mechanism. Therefore, the rack and pinion mechanism requires great mechanical strength. Specifically, the rack and pinion mechanism is subjected to various external forces originating from the reactive force of the road surface, as well as moderate external force caused by the steering of the driver. The rack and pinion mechanism requires mechanical strength that is sufficient to maintain the steering state despite these external forces.

The pinion of the rack and pinion mechanism requires sufficient strength that is needed to transmit great steering torque (steering torque that exceeds usual steering torque and corresponds to a greater load). Therefore, in many cases the pinion undergoes various surface treatments, such as carburization, high-frequency hardening, and other heat treatments, as well as shot peening, and the like.

However, performing heat treatments on the pinion causes the carbon components to diffuse in the surface of the torque transmission shaft that has the pinion. As a result, the surface of the torque transmission shaft is easily magnetized. Performing shot peening or another surface curing treatment on the pinion causes compressive stress to remain in the surface of the torque transmission shaft.

The magnetostrictive film formed on an external peripheral surface of the torque transmission shaft is commonly comprised of an Ni—Fe alloy film or another magnetostrictive plating material. This type of magnetostrictive plating material is highly susceptible to the effects of magnetism from the torque transmission shaft and to the effects of strain in the torque transmission shaft. The magnetostrictive film also receives the effects of external magnetism (for example, geomagnetism or noise from magnetism in the vehicle or the like) via the torque transmission shaft.

Thus, in cases in which the torque transmission shaft is provided with both a magnetostrictive film and a member that requires high strength, such as a pinion (torque transmission portion), there is room for improvement in increasing stability while maintaining a high level of sensitivity in the magnetostrictive properties of the magnetostrictive film. Increasing the stability of the magnetostrictive properties is related to the stability of the sensor signals generated by the magnetostrictive torque sensor.

In view of this, a technique is needed whereby a torque transmission shaft can be provided both with a magnetostrictive film and with a torque transmission portion by using appropriate processing, and whereby the sensitivity and stability of the magnetostrictive properties of the magnetostrictive film can be increased.

SUMMARY OF THE INVENTION

According to a first aspect of the present invention, there is provided a magnetostrictive torque sensor for detecting a torque, which sensor comprises: an operating shaft adapted to be applied with an external torque; a first hollow shaft and a second hollow shaft that are individually fixedly fitted to the operating shaft; a first magnetostrictive film formed on an external peripheral surface of the first hollow shaft; and a second magnetostrictive film formed on an external peripheral surface of the second hollow shaft.

Since the magnetostrictive films are thus formed separately on the external peripheral surfaces of the two hollow shafts, the two hollow shafts and the conditions for the two magnetostrictive films (for example, materials, magnetic properties, and heat treatment conditions) can be mutually different. Consequently, the magnetostrictive properties of the two magnetostrictive films can be individually optimized in view of the arrangement and fixing state of the two hollow shafts and the two magnetostrictive films on the operating shaft, and in accordance with the service conditions of the magnetostrictive torque sensor (for example, the effects of external magnetic fields or the temperature properties). Moreover, there is no need to adjust the magnetostrictive properties of the two magnetostrictive films after the operating shaft has been fixed in place in the hollow shafts. Consequently, it is possible to provide a magnetostrictive torque sensor in which the effects of the service environment are greatly reduced and sensing precision is increased.

Furthermore, the operating shaft and the first and second hollow shafts are separate members that are fitted and fixed together. A torque transmission portion for transmitting torque to a load in a state of separation from the first and second hollow shafts can be formed on the operating shaft. Therefore, the operating shaft can be subjected to carburization or another heat treatment, or to shot peening or another appropriate surface treatment in order to adequately ensure the strength necessary for torque transmission. Moreover, the magnetostrictive films are not formed on the operating shaft. The magnetostrictive films are formed by, e.g., magnetostriction plating. However, magnetostriction plating is not performed on the operating shaft. Therefore, the magnetostrictive plating material is not attached to the torque transmission portion in the operating shaft.

The magnetostrictive films can be formed in an appropriate state by magnetostriction plating or the like on the external peripheral surfaces of the first and second hollow shafts in a state of separation from the operating shaft. Specifically, the first magnetostrictive film is formed over the first hollow shaft, and the second magnetostrictive film is formed over the second hollow shaft. For example, a stabilization treatment for the shaft material prior to the magnetostriction plating, a heat treatment for stabilizing the magnetostrictive films, a high-frequency heat treatment or demagnetization treatment for setting the directions of magnetostriction in the magnetostrictive films, and other treatments can be performed under appropriate conditions. There is no need to vary the conditions (heating time, heating temperature, and the like) for forming the magnetostrictive films in accordance with the material of the operating shaft.

As described above, the operating shaft subjected to the action of external torque, and the first and second hollow shafts having the magnetostrictive films formed on their external peripheral surfaces are fitted and fixed together. The shaft comprised of the combination of the operating shaft subjected to the action of external torque, and the first and second hollow shafts is referred to as the torque transmission shaft. Both the first and second magnetostrictive films and the torque transmission portion can be formed on the torque transmission shaft by appropriate processing. Moreover, the sensitivity and stability of the magnetostrictive properties of the magnetostrictive films in the torque transmission shaft can be adequately increased. Increasing the sensitivity and stability of the magnetostrictive properties allows the sensor signals from the magnetostrictive torque sensor to be adequately stabilized and the sensing precision to be increased.

For example, the magnetostrictive torque sensor according to the first aspect of the present invention can be provided to an electric power steering apparatus for a vehicle. In this case, the steering torque transferred from the steering wheel to the torque transmission shaft can be detected stably and precisely by the magnetostrictive torque sensor. Auxiliary torque is outputted from an electric motor in accordance with the steering torque that has been stably and precisely detected. The steered vehicle wheels can be steered by the combined torque obtained by adding the auxiliary torque to the steering torque. Consequently, the steering feel of the steering wheel can be adequately improved.

The magnetostrictive torque sensor according to the first aspect of the present invention exhibits the same effects not only in the aforementioned electric power steering apparatus for a vehicle, but also when provided to a vehicle steering apparatus in a steer-by-wire steering system or a four-wheel-drive steeling system. The term "steer-by-wire steering system" refers to a steering system in which the steering mechanism for steering the steered vehicle wheels is mechanically separated from the steering wheel. In this steering system, the steered amount of the steering wheel is detected by the magnetostrictive torque sensor, a steering actuator generates steering power in accordance with this steered amount, and the steering power is transferred to the steering mechanism, thereby steering the steered vehicle wheels.

It is preferable that the diameter of the first hollow shaft be less than the diameter of the second hollow shaft, the operating shaft has a first fitting shaft fitted in a hole of the first hollow shaft, and a second fitting shaft fitted in a hole of the second hollow shaft, the first fitting shaft be located at a position near one end of the operating shaft, and the second fitting shaft be located at a position far from the one end of the operating shaft.

Preferably, the operating shaft comprises a fitting shaft and first and second small-diameter parts, the fitting shaft having a diameter set to be slightly larger than respective diameters of the small-diameter parts so as to allow the small-diameter parts to be fitted into opposite ends of the fitting shaft.

Desirably, the first and second hollow shafts each has a length larger than lengths of the first and second magnetostrictive films.

According to a second aspect of the present invention, there is provided a method for manufacturing a magnetostrictive torque sensor comprising a first magnetostrictive film and a second magnetostrictive film disposed on a surface of a torque transmission shaft adapted to be applied with an external torque, the method comprising the steps of: providing a first hollow shaft having the first magnetostrictive film formed on an external peripheral surface thereof, a second hollow shaft having the second magnetostrictive film formed on an external peripheral surface thereof, and an operating shaft fitted in the first and second hollow shafts; forming the torque transmission shaft by fitting and fixing one end of the operating shaft into the first hollow shaft and by fitting and fixing an opposite end of the operating shaft into the second hollow shaft; applying a predetermined torque to the operating shaft so as to apply the torque to the first and second magnetostrictive films; heating the first and second magnetostrictive films for a given predetermined period of time while the torque is being applied to the films; cooling the heated first and second magnetostrictive films; and terminating application of the torque to the magnetostrictive films.

In the step of forming the torque transmission shaft, the operating shaft is fitted from both ends separately into the first and second hollow shafts. The same portion of the operating shaft is not fitted into the two hollow shafts. The distance over which the operating shaft is fitted up to a predetermined position in the first hollow shaft and the distance over which the operating shaft is fitted up to a predetermined position in the second hollow shaft can be small. Therefore, operability is improved because the operating shaft can be fitted up to predetermined positions in the hollow shafts in a short amount of time. Moreover, the torque transmission shaft can be assembled with greater precision because the operating shaft can be fitted stably in the hollow shafts.

Furthermore, magnetostrictive films are formed separately on the external peripheral surfaces of the two hollow shafts. Therefore, the conditions for the two hollow shafts and the two magnetostrictive films (for example, materials, magnetic properties, and heat treatment conditions) can be mutually different. Consequently, the magnetostrictive properties of the two magnetostrictive films can be individually optimized in view of the arrangement and fixing state of the two hollow shafts and the two magnetostrictive films on the operating shaft, and in accordance with the service conditions of the magnetostrictive torque sensor (for example, the effects of external magnetic fields or the temperature properties). Moreover, there is no need to adjust the magnetostrictive properties of the two magnetostrictive films after the operating shaft has been fixed in place in the hollow shafts. Consequently, it is possible to provide a magnetostrictive torque sensor in which the effects of the service environment are greatly reduced and sensing precision is increased.

Furthermore, the operating shaft and the first and second hollow shafts are separate members that are fitted and fixed together. A torque transmission portion for transmitting torque to a load in a state of separation from the first and second hollow shafts can be formed on the operating shaft. Therefore, the operating shaft can be subjected to carburization or another heat treatment, as well as shot peening or another appropriate surface treatment in order to adequately ensure the strength necessary for torque transmission. Moreover, the magnetostrictive films are not formed on the operating shaft. The magnetostrictive films are formed by, e.g., magnetostriction plating. However, magnetostriction plating is not performed on the operating shaft. The magnetostrictive plating material is not attached to the torque transmission portion in the operating shaft.

The magnetostrictive films can be formed in an appropriate state by magnetostriction plating or the like on the external peripheral surfaces of the first and second hollow shafts in a state of separation from the operating shaft. Specifically, the first magnetostrictive film is formed over the first hollow shaft, and the second magnetostrictive film is formed over the second hollow shaft. For example, a shaft material stabilization treatment prior to the magnetostriction plating, a heat treatment for stabilizing the magnetostrictive films, a high-frequency heat treatment or demagnetization treatment for setting the directions of magnetostriction in the magnetostrictive films, and other treatments can be performed under appropriate conditions. There is no need to change the conditions (heating time, heating temperature, and the like) for forming the magnetostrictive films in accordance with the material of the operating shaft.

Furthermore, the first and second hollow shafts have fitting holes for fitting and fixing the operating shaft. Heat is blocked between the surfaces of the fitting holes and the external surface of the operating shaft when the first and second hollow shafts are heated. Therefore, the amount of heat transferred from the hollow shafts to the operating shaft is small compared with cases in which the hollow shafts are formed integrally on the operating shaft. Moreover, the first and second hollow shafts are members that are designed merely for forming the magnetostrictive films. Therefore, the first and second hollow shafts can be made extremely small, and the mass of the hollow shafts is therefore low. Consequently, during the step of heating the first and second magnetostrictive films, there is no need to heat the magnetostrictive films with a high temperature obtained by the excessive addition of heat discharged from the magnetostrictive films. As a result, since the magnetostrictive films can be prevented from reaching the Curie temperature, the magnetostrictive films can be formed without removing or degrading the magnetostrictive properties of the magnetostrictive films, loss of sensitivity can be prevented, and stability can be adequately increased. Moreover, the magnetostrictive films formed on the first and second hollow shafts are not subjected to the effects of magnetism from the operating shaft or the effects of strain in the operating shaft.

As described above, the operating shaft subjected to the action of external torque and the first and second hollow shafts having magnetostrictive films formed on their external peripheral surfaces are fitted and fixed together. The shaft comprised of the combination of the operating shaft subjected to the action of external torque and the first and second hollow shafts is referred to as the torque transmission shaft. The first and second magnetostrictive films and the torque transmission portion can both be formed on the torque transmission shaft by appropriate processing. Moreover, the sensitivity and stability of the magnetostrictive properties of the magnetostrictive films in the torque transmission shaft can be adequately increased. Increasing the sensitivity and stability of the magnetostrictive properties allows the sensor signals from the magnetostrictive torque sensor to be adequately stabilized and the sensing precision to be increased.

BRIEF DESCRIPTION OF THE DRAWINGS

Certain preferred embodiments of the present invention will be described in detail below, by way of example only, with reference to the accompanying drawings, in which:

FIGS. 4A through 4E are schematic views showing in exploded and assembled states the torque transmission shaft according to a first embodiment of the present invention, shown in FIG. 3;

FIGS. 6A through 6D are schematic views illustrating a method for forming the torque transmission shaft of FIGS. 4A through 4E;

FIG. 7 is a graph showing temperature properties of a magnetostrictive film during a heating step and a cooling step of FIGS. 6B and 6C;

FIGS. 8A through 8E are schematic views showing in exploded and assembled states a modification of the torque transmission shaft according to the first embodiment;

FIGS. 9A and 9B are schematic views showing in exploded and assembled states a torque transmission shaft according to a second embodiment of the present invention;

FIGS. 11A and 11B are schematic views showing in exploded and assembled states a modification of the torque transmission shaft according to the second embodiment; and FIGS. 12A and 12B illustrate in cross-section and side elevation a torque transmission shaft according to a third embodiment of the present invention.

DETAILED DESCRIPTION OF THE PREFERRED EMBODIMENTS

Figure 1:
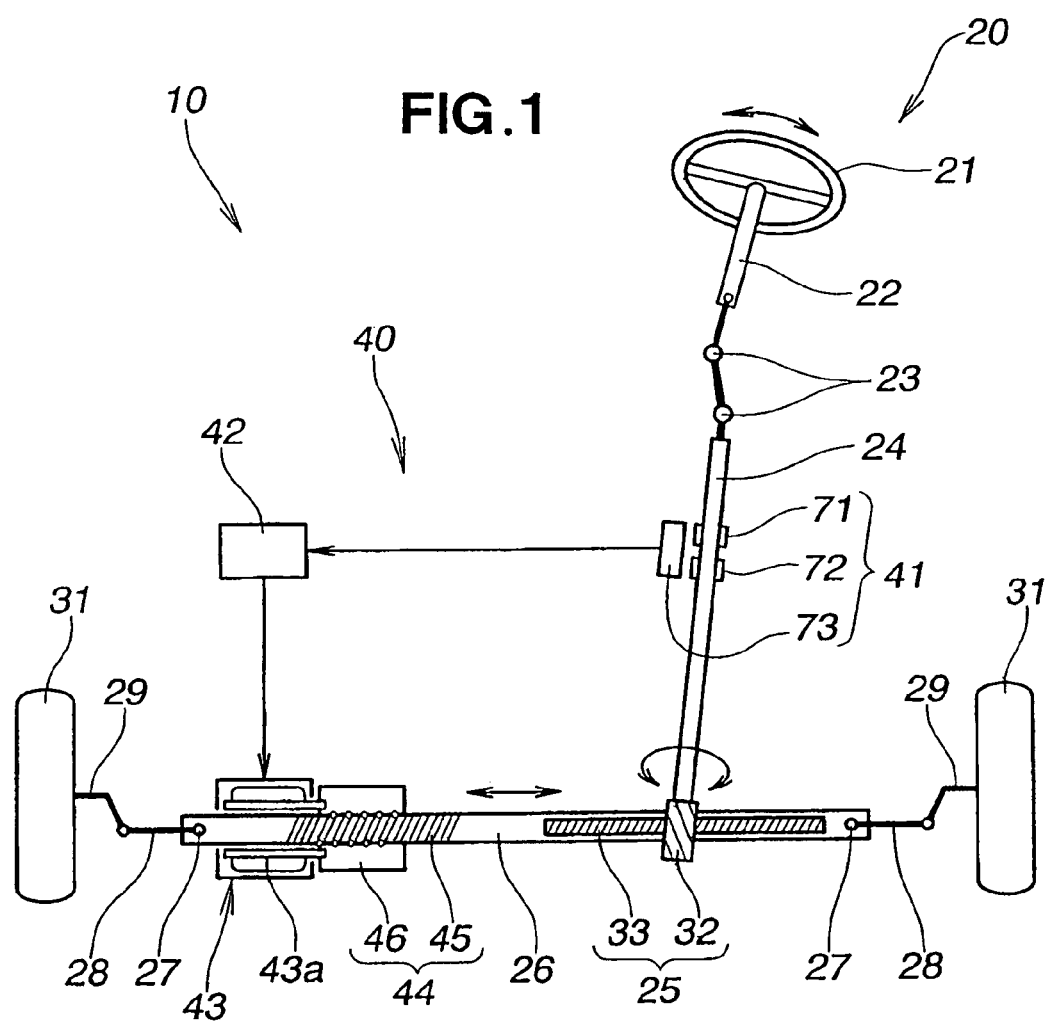
FIG. 1 is a schematic view showing an electric power steering apparatus including a magnetostrictive torque sensor according to the present invention.

Referring to FIGS. 1 through 5, an electric power steering apparatus employing a magnetostrictive torque sensor according to the present invention will be described. An electric power steering apparatus 10 for a vehicle is comprised of a steering system 20 that extends from a steering member 21 of the vehicle to steered wheels 31, 31 of the vehicle, and an auxiliary torque mechanism 40 for applying auxiliary torque to the steering system 20, as shown in FIG. 1.

The steering member 21 is comprised of, e.g., a steering wheel (the steering member 21 is hereinafter alternatively referred to as the "steering wheel 21" as appropriate). The steered wheels 31, 31 are, e.g., the left and right front wheels.

The steering system 20 is comprised of a steering wheel 21, a torque transmission shaft 24 joined to the steering wheel 21 via a steering shaft 22 and flexible drive couplings 23, 23, a rack shaft 26 joined to the torque transmission shaft 24 via a rack and pinion mechanism 25, and left and right steered wheels 31, 31 joined to the ends of the rack shaft 26 via ball joints 27, 27, tie-rods 28, 28, and knuckles 29, 29.

The rack and pinion mechanism 25 is comprised of a pinion 32 formed on the torque transmission shaft 24, and a rack 33 formed on the rack shaft 26.

Thus, in the electric power steering apparatus 10, the steering torque corresponding to the driver's steering of the steering wheel 21 is transmitted to the rack shaft 26 via the torque transmission shaft and the rack and pinion mechanism 25, whereby the steered wheels 31, 31 are steered via the rack shaft 26.

The auxiliary torque mechanism 40 is comprised of a magnetostrictive torque sensor 41, a controller 42, and an electric motor 43. The magnetostrictive torque sensor 41 detects the steering torque of the steering system 20 applied to the steering wheel 21. The controller 42 generates a control signal on the basis of a torque sensor signal from the magnetostrictive torque sensor 41. The electric motor 43 generates motor torque (auxiliary torque) corresponding to the steering torque on the basis of the control signal from the controller 42. A motor shaft 43a of the electric motor 43 is comprised of a hollow shaft that encloses the rack shaft 26. A ball screw 44 is a power transmission mechanism for transmitting motor torque to the rack shaft 26, and is comprised of a thread 45, a nut 46, and a large number of balls. The thread 45 is formed on the portion of the rack shaft 26 that excludes the rack 33. The nut 46 is a rotating member assembled with the thread 45 via the large number of balls, and the nut 46 is coupled with the motor shaft 43a.

In this electric power steering apparatus 10, the steering torque transmitted to the torque transmission shaft 24 can be detected by the magnetostrictive torque sensor 41, the motor torque corresponding to the steering torque can be generated by the electric motor 43, and the motor torque can be transmitted to the rack shaft 26. The steered wheels 31, 31 are steered via the rack shaft 26 by means of the combined torque resulting from the addition of the motor torque generated by the electric motor 43 to the steering torque.

Figure 2:
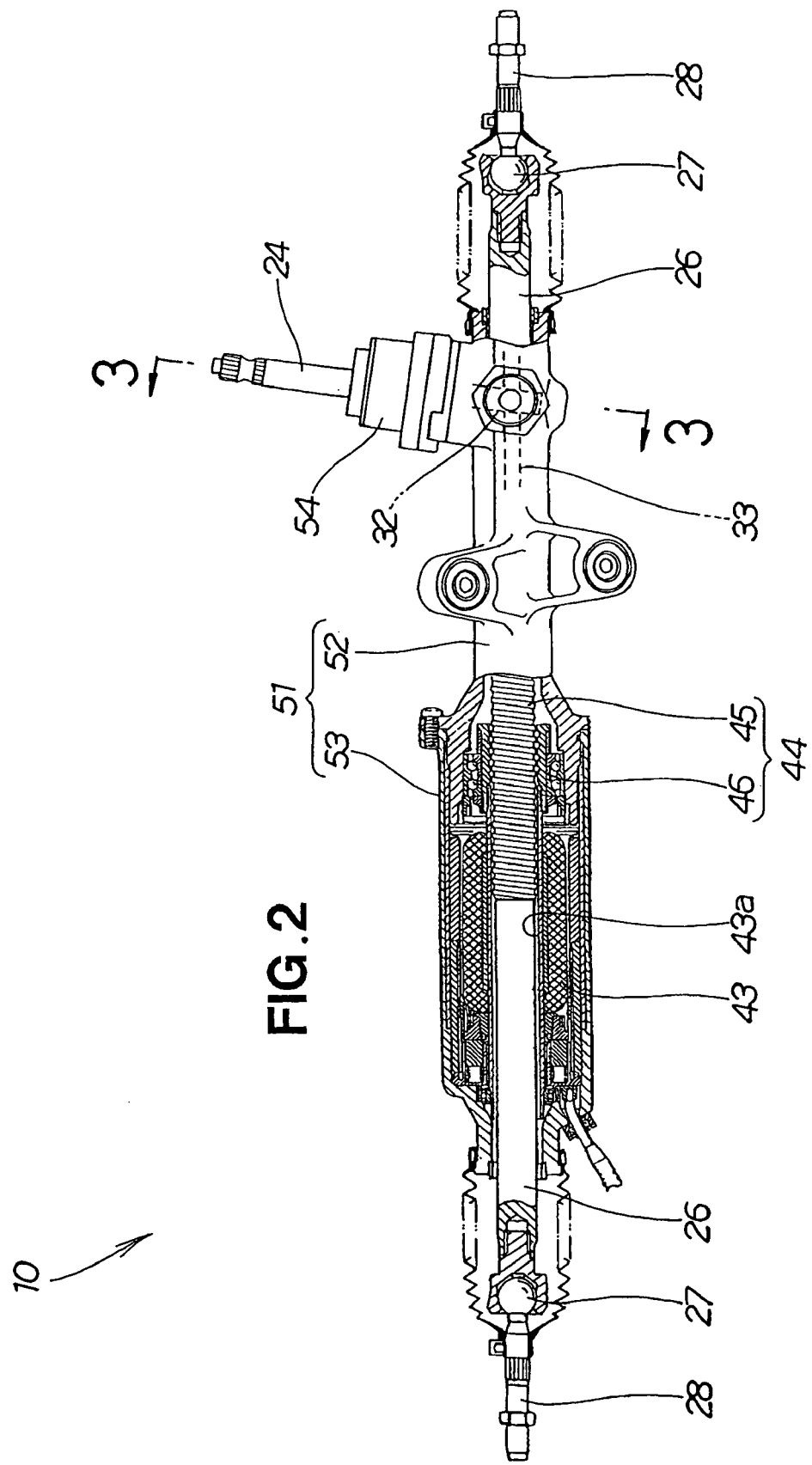
FIG. 2 is a schematic view showing details of an electric motor, a torque transmission shaft and a rack shaft shown in FIG. 1.

The rack shaft 26 is housed within a housing 51 that extends in the vehicle width direction (to the left and light), as shown in FIG. 2. The housing 51 is attached to a long, thin gearbox by using bolts to fasten together the end surfaces of a roughly tubular first housing 52 and second housing 53. The second housing 53 doubles as a motor case for the electric motor 43.

Figure 3:
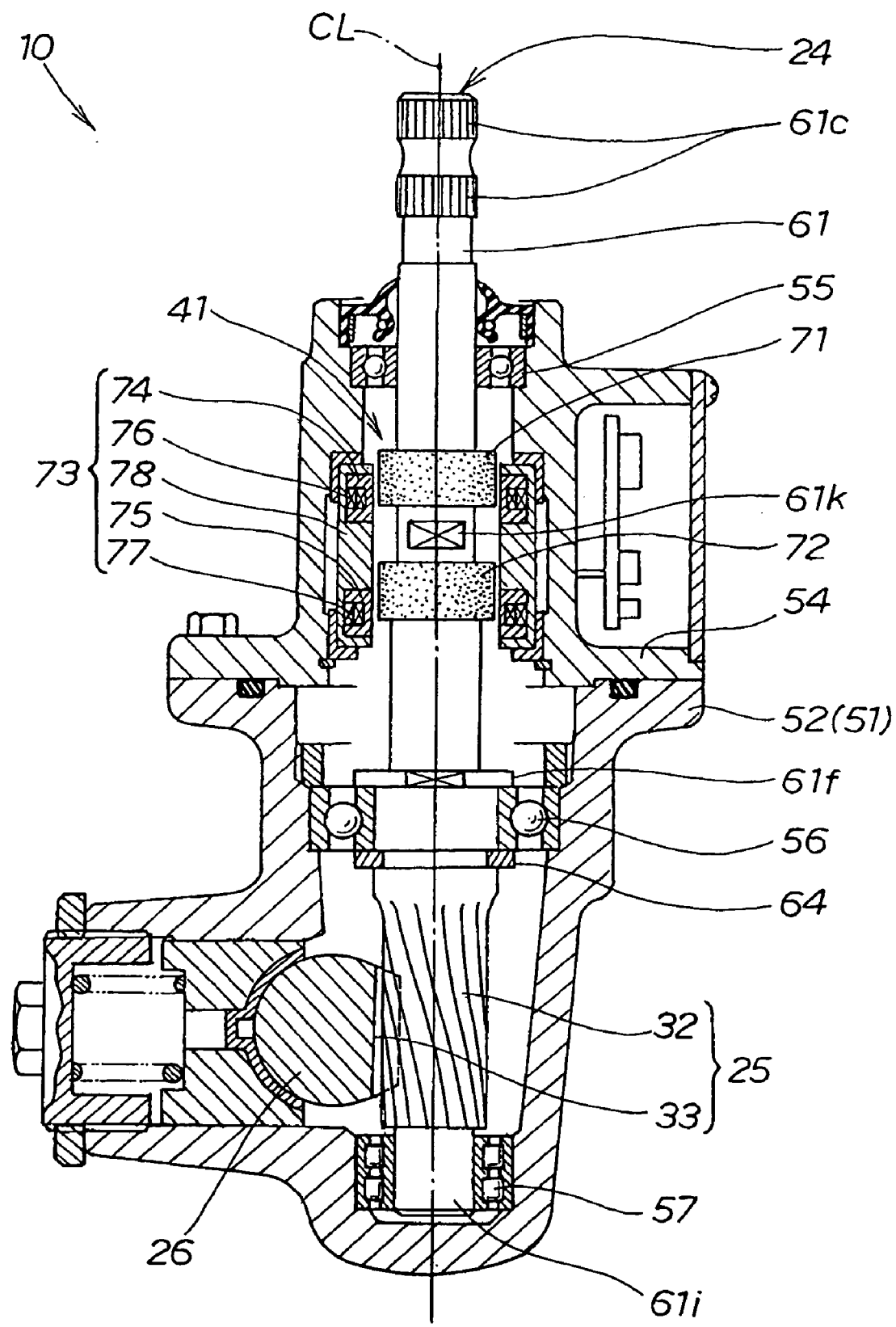
FIG. 3 is a cross-sectional view taken along line 3-3 of FIG. 2.

The torque transmission shaft 24, the rack and pinion mechanism 25, the magnetostrictive torque sensor 41, the electric motor 43, and the ball screw 44 are housed within the housing 51, as shown in FIGS. 2 and 3. The first housing 52 is closed off at the top opening by a lid 54. The top end, longitudinal center, and bottom end of the torque transmission shaft 24 are rotatably supported in the first housing 52 via three vertically aligned bearings 55, 56, 57.

Next, several preferred embodiments of the torque transmission shaft 24 will be described.

Figure 4A:
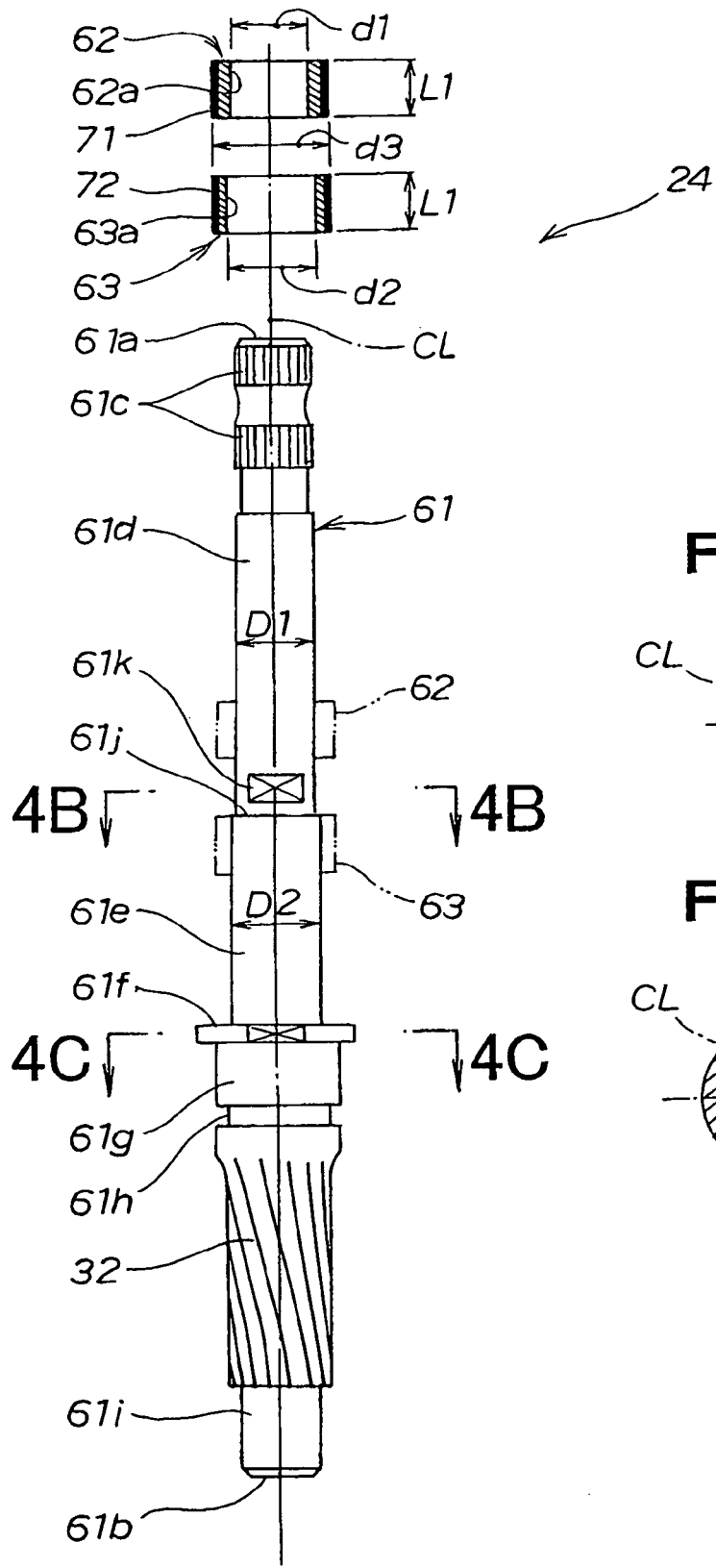
Figure 4B:
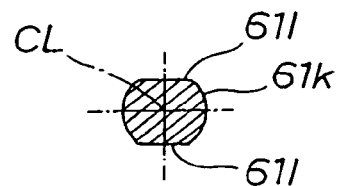
Figure 4C:
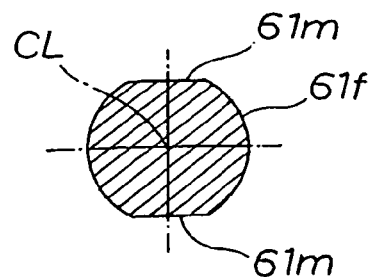

First, the torque transmission shaft 24 according to the first embodiment will be described in detail with reference to FIGS. 3 and 4A through 4E. FIG. 4A shows an exploded view of the torque transmission shaft 24. FIG. 4B shows the cross-sectional structure along the line 4B-4B in FIG. 4A. FIG. 4C shows the cross-sectional structure along the line 4C-4C in FIG. 4A. FIG. 4D shows the cross-sectional structure of the torque transmission shaft 24 in an assembled state. FIG. 4E shows an external view of the torque transmission shaft 24 in an assembled state.

The torque transmission shaft 24 is comprised of a pinion shaft 61 (operating shaft 61), a first hollow shaft 62, and a second hollow shaft 63, as shown in FIG. 4A. The pinion shaft 61, the first hollow shaft 62, and the second hollow shaft 63 are configured from separate members and are arranged coaxially together (arranged along the axis CL of the torque transmission shaft 24).

Furthermore, the pinion shaft 61, the first hollow shaft 62, and the second hollow shaft 63 are assembled integrally by being fitted and fixed together (joined together). For example, the pinion shaft 61 and the first and second hollow shafts 62, 63 are assembled integrally by pressure fitting.

The pinion shaft 61 and the first and second hollow shafts 62, 63 are comprised of a ferromagnetic material or other magnetic material. An example of a ferromagnetic material is steel including nickel-chromium-molybdenum steel).

Specifically, the pinion shaft 61 is a solid shaft in which a joining part 61c, a first fitting shaft 61d, a second fitting shaft 61e, a flange 61f, a mid-supported part 61g, a groove 61h for fitting a retaining ring, the pinion 32, and a lower supported part 61i are arranged in the indicated sequence along the axis CL from one end 61a of the axial direction to the other end 61b, as shown in FIG. 4A.

The joining part 61c, the first fitting shaft 61d, the second fitting shaft 61e, the flange 61f, the mid-supported part 61g, the groove 61h for fitting a retaining ring, the pinion 32, and the lower supported part 61i are formed integrally on the pinion shaft 61.

The joining part 61c is a portion that links to the flexible drive couplings 23 (see FIG. 1) and may, for example, be comprised of serrations. Specifically, the joining part 61c is formed into a noncircular shape as seen in cross-section, and a tool can reliably and stably engage with this part, as will be described later. Moreover, a tool can come into engagement with the part so that a bending moment is not applied to the magnetostrictive films 71, 72.

The first and second fitting shafts 61d, 61e are perfectly round, pillar-shaped shafts. A diameter D1 of the first fitting shaft 61d is set to be slightly greater than the diameter of the joining part 61c, and slightly smaller than the diameter D2 of the second fitting shaft 61e. The smaller first fitting shaft 61d is located at a position nearer to the one end 61a of the pinion shaft 61. The larger second fitting shaft 61e is located at a position farther from the one end 61a of the pinion shaft 61. In other words, the distance from the one end 61a to the second fitting shaft 61e is greater than the distance from the one end 61a to the first fitting shaft 61d.

Furthermore, the first fitting shaft 61d has a jig catch 61k formed in proximity to a border 61j with the second fitting shaft 61e. The jig catch 61k is a portion with which a below-described jig is engaged, and has a noncircular shaped shaft cross section when viewed from the end 61a of the pinion shaft 61, as shown in FIGS. 4A and 4B. More specifically, the jig catch 61k is a portion that has flat surfaces 61l, 61l on the external peripheral surface of the first fitting shaft 61d. A below-described tool can reliably and stably engage with the jig catch 61k having a noncircular shaped cross section.

The flange 6 if is formed between the second fitting shaft 61e and the mid-supported part 61g. The diameter of the flange 61f is greater than the diameter of the second fitting shaft 61e and the diameter of the mid-supported part 61g. The flange 61f is formed into a noncircular shape in axial cross-section when viewed from the side of the pinion shaft 61 with the one end 61a, as shown in FIGS. 4A and 4C. More specifically, the flange 61f is a portion that has flat surfaces 61m, 61m on the external peripheral surface. The flange 61f having a noncircular shaped cross section doubles as a jig catch. A below-described tool can reliably and stably engage with the flange 61f (jig catch).

The mid-supported part 61g is a portion rotatably supported by the bearing 56 (see FIG. 3) disposed in a middle position. The groove 61h for fitting a retaining ring is a portion where a retaining ring 64 (see FIG. 3) is attached for positioning the bearing 56 fitted on the mid-supported part 61g. The lower supported part 61i is a portion rotatably supported by the bearing 57 (see FIG. 3) disposed at the bottom.

The first hollow shaft 62 has the first magnetostrictive film 71 formed over the entire external peripheral surface. The second hollow shaft 63 has the second magnetostrictive film 72 formed over the entire external peripheral surface. The first magnetostrictive film 71 can be referred to as the "first strain-applied part 71" as appropriate. The second magnetostrictive film 72 can be referred to as the "second strain-applied part 72" as appropriate. Thus, the torque-side shaft 61 subjected to the action of external torque from the outside has the first magnetostrictive film 71 and the second magnetostrictive film 72 on the surface.

The first and second hollow shafts 62, 63 are comprised of perfectly round, short pipes centered around the axis CL. The first and second hollow shafts 62, 63 have a length of L1. A fitting hole 62a (first fitting hole 62a) in the first hollow shaft 62 and a fitting hole 63a (second fitting hole 63a) in the second hollow shaft 63 are perfectly round through-holes formed through the axis CL. The diameter d1 of the first fitting hole 62a is smaller than the diameter d2 of the second fitting hole 63a. A diameter of d3 is used both for the outside diameter of the first hollow shaft 62 in a state in which the first magnetostrictive film 71 has been formed, and for the outside diameter of the second hollow shaft 63 in a state in which the second magnetostrictive film 72 has been formed.

An interference fit is adopted both for the fit system of the first fitting shaft 61d in the first fitting hole 62a, and for the fit system of the second fitting shaft 61e in the second fitting hole 63a. The term "interference fit" refers to a fit system in which interference is always maintained when the hole and shaft are assembled together; i.e., a fit system in which the maximum diameter of the hole is smaller than the minimum diameter of the shaft, or, in an extreme case, the two diameters are equal to each other. The term "interference" refers to the amount by which the diameter of the hole is different from the diameter of the shaft prior to assembly in a case in which the diameter of the shaft is greater than the diameter of the hole.

The "interference" of the first fitting shaft 61d in the first fitting hole 62a and the "interference" of the second fitting shaft 61e in the second fitting hole 63a are set as needed to optimal values. Fitting the first fitting shaft 61d into the first fitting hole 62a makes it possible to add a constant load to the first hollow shaft 62 in the diameter direction. This load makes it possible to adjust dispersion in the magnetostrictive properties of the first magnetostrictive film 71. Similarly, fitting the second fitting shaft 61e into the second fitting hole 63a makes it possible to add a constant load to the second hollow shaft 63 in the diameter direction. This load makes it possible to adjust dispersion in the magnetostrictive properties of the second magnetostrictive film 72. More specifically, the diameter D1 of the first fitting shaft 61d is set to be slightly greater than the diameter d1 of the first fitting hole 62a. A diameter D2 of the second fitting shaft 61e is set to be slightly greater than the diameter d2 of the second fitting hole 63a. The method for fixing the pinion shaft 61 in place inside the first and second hollow shafts 62, 63 is not limited to an "interference fit."

The procedure for assembling the pinion shaft 61 and the first and second hollow shafts 62, 63 is as follows. First, the large-diameter second fitting shaft 61e, which is provided at a position far from the one end 61a of the pinion shaft 61, is fitted (fixed in place by pressure fitting) into the fitting hole 63a of the second hollow shaft 63, as shown in FIGS. 4A and 4B. Next, the small-diameter first fitting shaft 61d, which is provided at a position near the one end 61a of the pinion shaft 61, is fitted (fixed in place by pressure fitting) into the fitting hole 62a of the first hollow shaft 62. The operation of assembling the torque transmission shaft 24 is thereby complete. The result is shown in FIGS. 4D and 4E. The bottom end of the first hollow shaft 62 is disposed at a position in the first fitting shaft 61d that is separated from the border 61j with the second fitting shaft 61e by a distance L2 towards the one end 61a. The top end of the second hollow shaft 63 is disposed at the position of the border 61j in the second fitting shaft 61e.

When the second fitting shaft 61e is assembled in the second hollow shaft 63, the pinion shaft 61 is inserted into the second fitting hole 63a in the following sequence: one end 61a, small-diameter first fitting shaft 61d, large-diameter second fitting shaft 61e. Therefore, the small-diameter first fitting shaft 61d does not rub against the large-diameter second fitting hole 63a. When the first fitting shaft 61d is assembled in the first hollow shaft 62, the first fitting shaft 61d is not inserted into the second fitting hole 63a. In other words, only the second fitting shaft 61e rubs against the second fitting hole 63a. Only the first fitting shaft 61d rubs against the first fitting hole 62a. Since these components rub against each other only once, the external peripheral surfaces (fitting surfaces) of the first and second fitting shafts 61d, 61e and the internal peripheral surfaces (fitting surfaces) of the first and second fitting holes 62a, 63a are not roughened. Since the fitting shafts 61d, 61e can be fitted stably within the fitting holes 62a, 63a, the torque transmission shaft 24 can be assembled with greater precision.

The pinion shaft 61 and the first and second hollow shafts 62, 63 assembled in this manner are mutually restricted in their relative rotation and relative axial movement. The steering torque transferred from the steering wheel 21 (see FIG. 1) to the pinion shaft 61 via the joining part 61c is also transmitted to the first and second hollow shafts 62, 63 from the pinion shaft 61. The pinion shaft 61 is preferably made into a hollow shaft rather than a solid shaft in order to achieve light weight.

Next, the magnetostrictive torque sensor 41 will be described in detail.

The magnetostrictive torque sensor 41 is comprised of the first and second strain-applied parts 71, 72 and a sensor unit 73, as shown in FIG. 3. The first and second strain-applied parts 71, 72 are impressed with an applied strain and are provided on the surface of the torque transmission shaft 24. The first and second strain-applied parts 71, 72 vary in their magnetostrictive properties in accordance with external torque applied from the outside. The sensor unit 73 is provided around the first and second strain-applied parts 71, 72, and the sensor unit 73 electrically detects magnetostriction effects generated in the first and second strain-applied parts 71, 72 and outputs a sensor signal. This sensor signal is a torque sensor signal.

Specifically, the first and second strain-applied parts 71, 72 are a pair of magnetic anisotropic members in which additional strain is applied in a direction opposite from the longitudinal direction of the pinion shaft 61, as shown in FIGS. 3, 4D, and 4E. Specifically, the first and second strain-applied parts 71, 72 are comprised of magnetostrictive films formed on the external peripheral surfaces (external peripheral surfaces of shafts, face surfaces) of the first and second hollow shafts 62, 63.

The first and second magnetostrictive films 71, 72 (first and second strain-applied parts 71, 72) are comprised of plating layers of a mostly constant width formed over the entire peripheries of the first and second hollow shafts 62, 63. The first and second magnetostrictive films 71, 72 have mutually opposite directions of magnetostriction. The first magnetostrictive film 71 and the second magnetostrictive film 72 are separated by a predetermined interval L2 in the axial direction of the pinion shaft 61. The torque transmission shaft 24 has a non-magnetostrictive portion in the interval L2 between the first magnetostrictive film 71 and the second magnetostrictive film 72. No magnetostrictive film is formed in the non-magnetostrictive portion.

The two magnetostrictive films 71, 72 are comprised of a material that has a large change in magnetic flux density in relation to changes in strain. For example, the magnetostrictive films 71, 72 may be Ni—Fe alloy films formed by vapor-phase plating on the external peripheral surfaces of the first and second hollow shafts 62, 63. The thickness of these alloy films is preferably about 5 to 20 μm. The films may also be less than 5 to 20 μm or greater than 5 to 20 μm in thickness. The magnetostrictive direction of the second magnetostrictive film 72 is different from the magnetostrictive direction of the first magnetostrictive film 71. In other words, the films have magnetic anisotropy.

The Ni—Fe alloy films have a greater magnetostriction effect when the Ni content is about 20 wt % or about 50 wt % because of a higher magnetostriction constant. Therefore, a material that has an Ni content of about 20 wt % or about 50 wt % is preferably used for the Ni—Fe alloy films. For example, a material containing 50 to 60 wt % of Ni, with the balance being Fe, may be used for the Ni—Fe alloy films. The magnetostrictive films can be ferromagnetic films, and may be Permalloy films (Ni: about 78 wt %, Fe: balance) or Supermalloy films (Ni: 78 wt %, Mo: 5 wt %, Fe: balance). Ni is nickel, Fe is iron, and Mo is molybdenum.

The sensor unit 73 is comprised of cylindrical coil bobbins 74, 75 for accommodating the torque-side shaft 61; a first multilayer solenoid-winding coil 76 and a second multilayer solenoid-winding coil 77 that are wound around the coil bobbins 74, 75; and a magnetically shielding back yoke 78 that encircles the peripheries of the first and second multilayer solenoid-winding coils 76, 77.

The first and second multilayer solenoid-winding coils 76, 77 are sensor coils. Hereinbelow, the first multilayer solenoid-winding coil 76 is alternatively referred to as a first sensor coil 76. The second multilayer solenoid-winding coil 77 is alternatively referred to as a second sensor coil 77. The first sensor coil 76 is wound with a gap around the periphery of the first strain-applied part 71. The second sensor coil 77 is wound with a gap around the periphery of the second strain-applied part 72.

Figure 5:
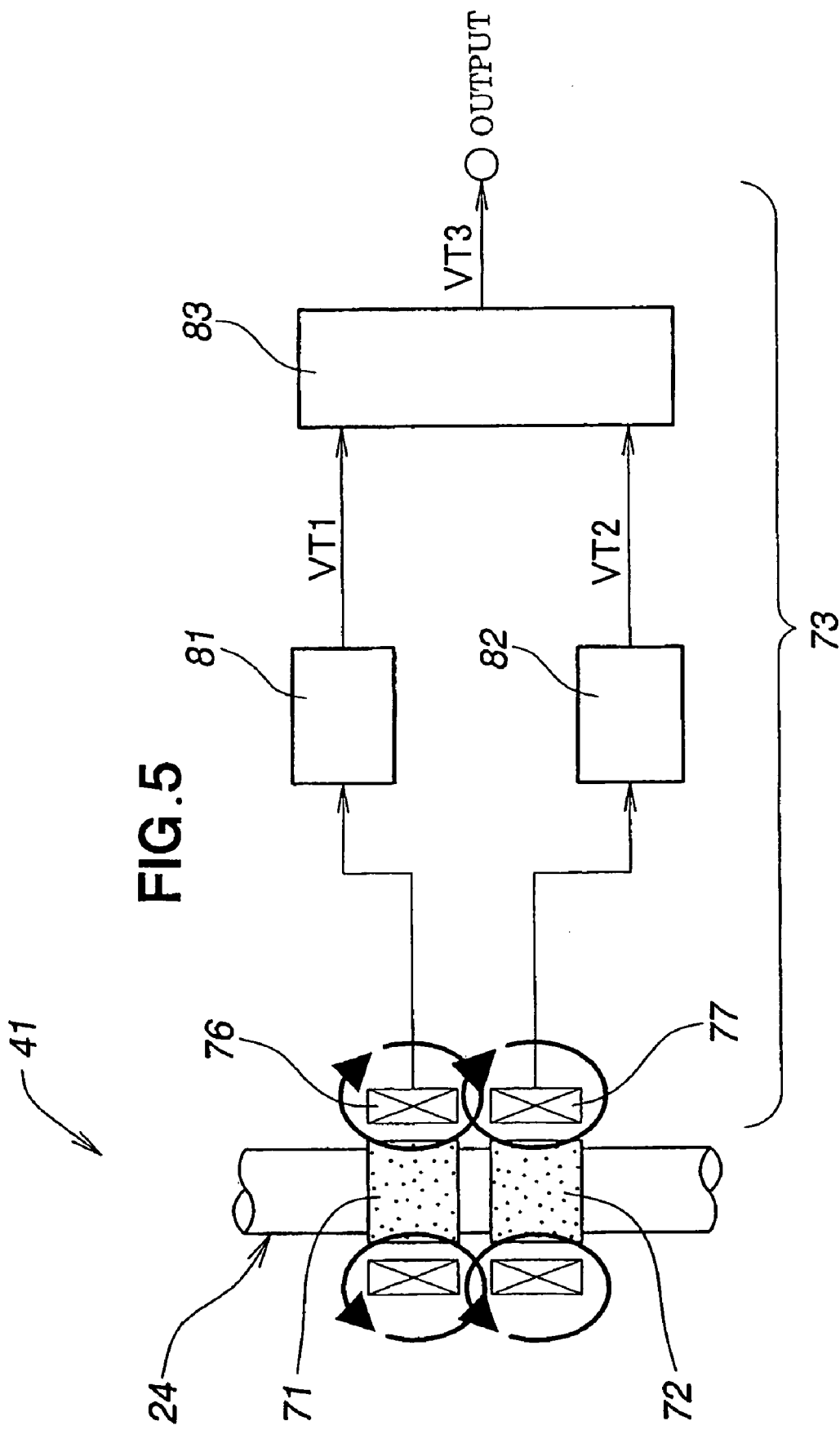
FIG. 5 is a circuit diagram of the magnetostrictive torque sensor shown in FIG. 3.

Furthermore, the sensor unit 73 has first and second conversion circuits 81, 82, and a torque signal output circuit 83, as shown in FIG. 5. The first conversion circuit 81 rectifies, amplifies, and converts a sensor signal from the first sensor coil 76, and outputs the result as a detected voltage VT1. The second conversion circuit 82 rectifies, amplifies, and converts a sensor signal from the second sensor coil 77, and outputs the result as a detected voltage VT2. The torque signal output circuit 83 calculates the detected voltages VT1, VT2, and outputs the results as a torque-sensing voltage VT3.

The sensor unit 73 operates as follows. The first and second sensor coils 76, 77 detect the torsion in the pinion shaft 61 (see FIG. 3) in accordance with the steering torque, and generate sensor signals. These sensor signals are outputted from the first and second conversion circuits 81, 82 as detected voltages VT1, VT2. These detected voltages VT1, VT2 are outputted as a torque-sensing voltage VT3 from the torque signal output circuit 83. The torque-sensing voltage VT3 is a torque-sensing signal (steering torque signal).

A summarized description of the magnetostrictive torque sensor 41 is as follows. The first and second hollow shafts 62, 63 have strained magnetostrictive films 71, 72. When external torque is applied from the pinion shaft 61 to the first and second magnetostrictive films 71, 72 via the first and second hollow shafts 62, 63, the magnetic permeability of the magnetostrictive films 71, 72 varies according to this external torque. The impedance (induced voltage, detected voltage) in the first and second sensor coils 76, 77 varies according to the variations in magnetic permeability. The direction and value of external torque applied to the pinion shaft 61 can be detected by sensing the change in impedance.

A summary of the above descriptions is as follows. The pinion shaft 61 is referred to as the "operating shaft 61" as appropriate. The operating shaft 61 and the first and second hollow shafts 62, 63 are separate members that are fitted and fixed together; e.g., that are joined together by pressure fitting, as shown in FIGS. 4A through 4E. The operating shaft 61 is a member that transmits external torque applied from the outside to loads 31, 31 (the steered vehicle wheels 31, 31 shown in FIG. 1). The first and second hollow shafts 62, 63 are members in which the magnetostrictive films 71, 72 are formed on the external peripheral surfaces.

A torque transmission portion 32 (pinion 32) for transmitting external torque to the loads 31, 31 in a state of separation from the first and second hollow shafts 62, 63 can be formed on the operating shaft 61. Therefore, the operating shaft 61 can be subjected to carburization or another heat treatment, as well as shot peening or another appropriate surface treatment in order to adequately ensure the strength necessary for torque transmission.

Moreover, the magnetostrictive films 71, 72 are not formed on the operating shaft 61. The magnetostrictive films 71, 72 are formed by magnetostriction plating. However, magnetostriction plating is not performed on the operating shaft 61. The magnetostrictive plating material is not attached to the torque transmission portion 32 in the operating shaft 61.

The magnetostrictive films 71, 72 can be formed in an optimal state by magnetostriction plating or the like on the external peripheral surfaces of the first and second hollow shafts 62, 63 in a state of separation from the operating shaft 61. Specifically, the first magnetostrictive film 71 is formed over the first hollow shaft 62, and the second magnetostrictive film 72 is formed over the second hollow shaft 63.

For example, a shaft material stabilization treatment prior to the magnetostriction plating, a heat treatment for stabilizing the magnetostrictive films 71, 72, a high-frequency heat treatment or demagnetization treatment for setting the directions of magnetostriction in the magnetostrictive films 71, 72, and other treatments can be performed under appropriate conditions. There is no need to change the conditions (heating time, heating temperature, and the like) for forming the magnetostrictive films 71, 72 in accordance with the material of the operating shaft 61. Furthermore, the first and second hollow shafts 62, 63 can be modified separately from the operating shaft 61 in order to ensure the torsional rigidity and other necessary mechanical properties required in the shafts 62, 63 themselves. Thus, the magnetostrictive films 71, 72 and the torque transmission portion 32 can both be formed by processing that is appropriate for the torque transmission shaft 24. Moreover, the stability of the magnetostrictive properties of the magnetostrictive films 71, 72 can be adequately increased. Increasing the stability of the magnetostrictive properties allows the sensor signals from the magnetostrictive torque sensor 41 to be adequately stabilized and the sensing precision to be increased.

Furthermore, the first and second hollow shafts 62, 63 have fitting holes 62a, 63a for fitting and fixing the operating shaft 61, e.g., for joining the operating shaft 61 by pressure fitting. Heat is blocked between the surfaces of the fitting holes 62a, 63a and the external surface of the operating shaft 61 when the first and second hollow shafts 62, 63 are heated. Therefore, the amount of heat transferred from the hollow shafts 62, 63 to the operating shaft 61 is small compared with cases in which the hollow shafts 62, 63 are formed integrally on the operating shaft 61. Moreover, the first and second hollow shafts 62, 63 are members that are designed merely for forming the magnetostrictive films 71, 72. Therefore, the first and second hollow shafts 62, 63 can be made extremely small, and the mass of the hollow shafts 62, 63 is therefore low. Consequently, during the step of heating the first and second magnetostrictive films 71, 72, there is no need to heat the magnetostrictive films 71, 72 with a high temperature obtained by the excessive addition of heat discharged from the magnetostrictive films 71, 72. As a result, since the magnetostrictive films 71, 72 can be prevented from reaching the Curie temperature, the magnetostrictive films 71, 72 can be formed without removing or degrading their magnetostrictive properties, loss of sensitivity can be prevented, and stability can be adequately increased.

In cases in which the hollow shafts 62, 63 are formed integrally on the operating shaft 61, the heat used while the surfaces of the magnetostrictive films 71, 72 are heated is easily transmitted without change (the heat does not escape) from the magnetostrictive films 71, 72 to the operating shaft 61 via the hollow shafts 62, 63 during the step of heating the first and second magnetostrictive films 71, 72. The surface temperatures of the magnetostrictive films 71, 72 must be doubled in order to ensure that the heating temperature of the magnetostrictive films 71, 72 is kept at a predetermined level. There is concern that the magnetostrictive films 71, 72 may thereby be brought to the Curie temperature.

As described above, in the present invention, there is no need to heat the magnetostrictive films 71, 72 with a high temperature obtained by the excessive addition of heat discharged from the magnetostrictive films 71, 72. As a result, the magnetostrictive films 71, 72 do not reach the Curie temperature. Moreover, the magnetostrictive films 71, 72 formed on the first and second hollow shafts 62, 63 are not subjected to the effects of magnetism from the operating shaft 61, or to the effects of strain in the operating shaft.

The magnetostrictive torque sensor 41 can be provided to the vehicle electric power steering apparatus 10 shown in FIG. 1. In this case, the steering torque transferred from the steering wheel 21 to the torque transmission shaft 24 can be detected stably and precisely by the magnetostrictive torque sensor 41. An auxiliary torque is outputted from the electric motor 43 in accordance with the stably and precisely detected steering torque. The steered wheels 31, 31 can be steered by the combined torque obtained by adding auxiliary torque to the steering torque. Consequently, the steering feel in the steering wheel 21 can be adequately enhanced.

Furthermore, since the first and second hollow shafts 62, 63 have fitting holes 62a, 63a that pass completely through in the axial direction, the effect of the shaft interior on the magnetostrictive films 71, 72, e.g., heat treatment, magnetization nonuniformity, and other effects, can be further reduced.

Furthermore, the first and second hollow shafts 62, 63 are members that are separate from the operating shaft 61. Therefore, the first hollow shaft 62 that has the first magnetostrictive film 71 and the second hollow shaft 63 that has the second magnetostrictive film 72 can be produced on a mass scale by the manufacturing method that will be described next. Since the labor involved in production can be greatly reduced, the productivity of the first and second hollow shafts 62, 63 can be further increased, and as a result, costs can be reduced.

The manufacturing method is as follows. First, a long hollow material having fitting holes 62a and a long hollow material having fitting holes 63a are prepared. Next, a magnetostrictive film is formed over the entire external peripheral surface of the long hollow material having fitting holes 62a, and a magnetostrictive film is formed over the entire external peripheral surface of the long hollow material having fitting holes 63a. Next, the long hollow material having fitting holes 62a is cut into predetermined lengths to obtain a plurality of first hollow shafts 62. The long hollow material having fitting holes 63a is also cut into predetermined lengths to obtain a plurality of second hollow shafts 63.

In addition to the vehicle electric power steering apparatus 10 described above, the magnetostrictive torque sensor 41 having the above configuration also exhibits the same effects when provided to a vehicle steering apparatus in a steer-by-wire steering system or a four-wheel-drive steering system.

A steer-by-wire steering system is a steering system in which the steering mechanisms (torque transmission shaft 24 and rack shaft 26) for steering the steered wheels 31, 31 in FIG. 1 are mechanically separated from the steeling wheel 21.

The following is a description of the method for manufacturing the magnetostrictive torque sensor 41, and particularly the torque transmission shaft 24. The torque transmission shaft 24 is manufactured using the steps shown in FIGS. 4A through 4E and FIGS. 6A through 6D. FIGS. 6A through 6D show the method for forming the torque transmission shaft. The bearing 56 (see FIG. 3) is omitted from FIGS. 6A through 6D.

First, the first hollow shaft 62 in which the first magnetostrictive film 71 is formed on the external peripheral surface, the second hollow shaft 63 in which the second magnetostrictive film 72 is formed on the external peripheral surface, and the operating shaft 61 fitted in the first and second hollow shafts 62, 63 are prepared (shaft preparation step), as shown in FIG. 4A.

Next, the torque transmission shaft 24 is manufactured (shaft joining step) by fitting and fixing (i.e., pressure fitting) the operating shaft 61 in the first and second-hollow shafts 62, 63, as shown in FIG. 4D.

Next, a heating device (e.g., a high-frequency hardening device 96) is set on the first and second magnetostrictive films 71, 72, as shown in FIG. 6A. The high-frequency hardening device 96 is comprised of a first heating coil 96a that encircles the periphery of the first magnetostrictive film 71, a second heating coil 96b that encircles the periphery of the second magnetostrictive film 72, and a power source 96c that supplies high-frequency AC electric power to the first and second heating coils 96a, 96b.

Next, a first jig 91 is placed into engagement with the joining part 61c (jig catch) of the operating shaft 61, a second jig 92 is placed into engagement with the flange 6 if (jig catch) of the operating shaft 61, and a third jig 93 is placed into engagement with the jig catch 61k of the operating shaft 61, as shown in FIG. 6B. Furthermore, the first and second jigs 91, 92 are arranged to engage with fixing members 94, 95, thereby preventing rotation. In other words, rotation of the first and second jigs 91, 92 is restricted.

Next, the third jig 93 is twisted clockwise R1 in the drawing as shown in FIG. 6B. Thus, a torque is applied in a predetermined forward direction to the operating shaft 61 and the first and second hollow shafts 62, 63. The applied torque is preferably about 15 to 100 Nm. The applied torque may also be greater than this amount. As a result, the torque is also applied in the forward direction to the first and second magnetostrictive films 71, 72 (external force adding step).

Next, while an applied torque created by the third jig 93 is applied, the high-frequency hardening device 96 is used to heat the two magnetostrictive films 71, 72 for a predetermined amount of time (heating step), as shown in FIG. 6B.

Next, the first and second magnetostrictive films 71, 72 are cooled to a lower temperature than the temperature to which they were heated (cooling step), as shown in FIG. 6C.

Next, the twisting of the third jig 93 is ended, and the torque application is terminated (external force releasing step), as shown in FIG. 6C.

Lastly, all of the jigs 91 to 93 and the high-frequency hardening device 96 are removed from the torque transmission shaft 24, completing the operation, as shown in FIG. 6D.

Next, the operation characteristics established in the heating step and the cooling step will be described based on FIG. 7 with reference to FIGS. 6B and 6C. FIG. 7 shows an example of the temperature change in the magnetostrictive films 71, 72 during the heating step and cooling step, where the horizontal axis represents elapsed time, and the vertical axis represents the surface temperature of the magnetostrictive films.

In the heating step, high-frequency AC electric power is supplied from the high-frequency hardening device 96 to the first and second heating coils 96a, 96b for a predetermined amount of heating time from time 0 to time ti, whereby the first and second magnetostrictive films 71, 72 are heated to a temperature Te. The heating time is preferably about 3 to 5 seconds. The time may be longer than this as well. The heating temperature Te is preferably about 400° C. At this point, the heating step is completed by stopping the high-frequency hardening device 96.

When the high-frequency hardening device 96 is stopped, the subsequent cooling step begins. The first and second magnetostrictive films 71, 72 can be adequately cooled at the external air temperature in cases in which the time for heating the first and second magnetostrictive films 71, 72 by high-frequency hardening is set to about 3 to 5 seconds in the previous heating step FIG. 7 shows the state in which the temperature of the first and second magnetostrictive films 71, 72 gradually decreases after time ti due to natural cooling. Since the heating temperature of the first and second magnetostrictive films 71, 72 is about 400° C., the first and second magnetostrictive films 71, 72 can be cooled to a temperature equal to or less than this temperature.

Thus, in the manufacturing method of the present invention, the torque transmission shaft 24 is first manufactured by fitting and fixing, e.g., by pressure fitting and joining, the operating shaft 61 and the first and second hollow shafts 62, 63 in which the magnetostrictive films 71, 72 are formed on the external peripheral surfaces. Strain is created in the magnetostrictive films 71, 72 affected by the pressure fitting, and this strain usually remains unchanged.

By contrast, in the manufacturing method of the present invention, the magnetostrictive films 71, 72 are then heat-treated for a predetermined amount of time in a state in which a predetermined torque is applied to the operating shaft 61. After the heat treatment is complete, the magnetostrictive films 71, 72 are cooled to a lower temperature than the temperature to which they were heated, and the torque application to the operating shaft 61 is terminated.

Thus, the magnetostrictive films 71, 72 are heat-treated for a pre-determined amount of time in a state in which a torque is applied, whereby creep can be created in the magnetostrictive films 71, 72. Specifically, the creep created by the heat treatment in the heat-treating the magnetostrictive films 71, 72 can be used to reduce or eliminate the strain remaining in the magnetostrictive films 71, 72. Moreover, heat-treating the magnetostrictive films 71, 72 while applying a torque makes it possible to use the creep to remove the strain applied to the magnetostrictive films 71, 72. When the torque application is interrupted after cooling, elastic strain can be created in the magnetostrictive films 71, 72 by the elastic restoring torque of the pinion shaft 61 and the hollow shafts 62, 63 (the torque that causes these components to return to their original positions due to their own elasticity). In other words, strain is created in the magnetostrictive films 71, 72 because termination of the torque application causes the pinion shaft 61 and the first and second hollow shafts 62, 63 to return to their original positions due to their own elasticity. As a result, the directions of magnetostriction in the magnetostrictive films 71, 72 can be reliably and easily inclined in the torque application direction and in the opposite direction. In other words, magnetostrictive anisotropy can be set between the first magnetostrictive film 71 and the second magnetostrictive film 72.

Thus, in the manufacturing method of the present invention, the magnetostrictive films 71, 72 and the torque transmission portion 32 can both be formed on the torque transmission shaft 24 by appropriate processing. Moreover, the stability of the magnetostrictive properties of the magnetostrictive films 71, 72 can be adequately increased. Increasing the stability of the magnetostrictive properties allows the sensor signals from the magnetostrictive torque sensor 41 to be adequately stabilized and the sensing precision to be increased.

Furthermore, combining the three members, i.e., the operating shaft 61 and the first and second hollow shafts 62, 63, makes it possible to simultaneously perform the following two processes regardless of whether the torque transmission shaft 24 is manufactured.

The first process is a process in which strain created in the magnetostrictive films 71, 72 is reduced or eliminated by pressure fitting and joining the operating shaft 61 to the first and second hollow shafts 62, 63.

The second process is a process in which the direction of magnetostriction in the magnetostrictive films 71, 72 is set, e.g., magnetostrictive anisotropy is set.

Consequently, it is possible to easily manufacture, in a small number of steps, the torque transmission shaft 24 having the magnetostrictive films 71, 72 whose magnetostrictive properties have adequately increased stability. As a result, the productivity of the magnetostrictive torque sensor 41 can be increased.

Furthermore, the magnetostrictive films 71, 72 are formed separately on the external peripheral surfaces of the two hollow shafts 62, 63, as shown in FIGS. 4A through 4E. Therefore, the conditions for the two hollow shafts 62, 63 and the two magnetostrictive films 71, 72 (for example, materials, magnetic properties, and heat treatment conditions) can be mutually different. Consequently, the magnetostrictive properties of the two magnetostrictive films 71, 72 can be individually optimized in view of the arrangement and fixing state of the two hollow shafts 62, 63 and the two magnetostrictive films 71, 72 on the operating shaft 61, and in accordance with the service conditions of the magnetostrictive torque sensor 41 (for example, the effects of external magnetic fields or the temperature properties). Moreover, there is no need to adjust the magnetostrictive properties of the two magnetostrictive films 71, 72 after the operating shaft 61 has been fixed in place in the hollow shafts 62, 63. Consequently, it is possible to provide a magnetostrictive torque sensor 41 in which the effects of the service environment are greatly reduced and the sensing precision is enhanced.

Next, a modification of the first embodiment and another embodiment will be described. The parts of the structure and manufacturing method that are the same as in the embodiment shown in FIGS. 1 through 7 are denoted by the same numerical symbols and are not described.

A modification of the first embodiment is described with reference to FIGS. 8A through 8E. A torque transmission shaft 124 of the modification is substantially the same as the torque transmission shaft 24 shown in FIGS. 1 through 7. In other words, the torque transmission shaft 124 is used in place of the torque transmission shaft 24.

FIG. 8A shows an exploded view of the torque transmission shaft 124 of the modification, which corresponds to the torque transmission shaft 24 shown in FIG. 4A. FIG. 8B shows a cross-sectional structure along the line 8B-8B in FIG. 8A. FIG. 8C shows a cross-sectional structure along the line 8C-8C in FIG. 8A. FIG. 8D shows a cross-sectional structure of the torque transmission shaft 124 in an assembled state. FIG. 8E shows an external view of the torque transmission shaft 124 in an assembled state.

The torque transmission shaft 124 is comprised of a pinion shaft 161 (operating shaft 161), a first hollow shaft 162, and a second hollow shaft 163, as shown in FIG. 8A. The pinion shaft 161, the first hollow shaft 162, and the second hollow shaft 163 are configured from separate members and are arranged on the same axis (arranged on the axis CL of the torque transmission shaft 124).

Furthermore, the pinion shaft 161 and the first and second hollow shafts 162, 163 are assembled integrally by being fitted and fixed together (joined together). For example, the pinion shaft 161 and the first and second hollow shafts 162, 163 are assembled integrally by pressure fitting.

The pinion shaft 161 and the first and second hollow shafts 162, 163 are comprised of a ferromagnetic material or other magnetic material. An example of a ferromagnetic material is steel (including nickel-chromium-molybdenum steel). Specifically, the pinion shaft 161 is a solid shaft in which a joining part 161c, a small-diameter part 161d, a fitting shaft 161e, a jig catch 161f, a mid-supported part 161g, a groove 161h for fitting a retaining ring, the pinion 32, and a lower supported part 161i are arranged in the indicated sequence along the axis CL from one end 161a of the axial direction to the other end 161b, as shown in FIG. 8A.

The joining part 161c, the small-diameter part 161d, the fitting shaft 161e, the jig catch 161f, the mid-supported part 161g, the groove 161h for fitting a retaining ring, the pinion 32, and the lower supported part 161i are formed integrally on the pinion shaft 161.

Following is a description of the parts of the pinion shaft 161, as contrasted with the pinion shaft 61 shown in FIGS. 4A through 4C.

The joining part 161c has the same configuration as the joining part 61c shown in FIG. 4A. The small-diameter part 161d is a perfectly round, pillar-shaped shaft similar to the first fitting shaft 61d shown in FIG. 4A. The fitting shaft 161e is a perfectly round, pillar-shaped shaft similar to the second fitting shaft 61e shown in FIG. 4A. The diameter D2 of the fitting shaft 161e is the same as the diameter of the second fitting shaft 61e, and is set to be slightly larger than the diameter D1 of the small-diameter part 161d and a diameter D3 of a small-diameter part 161j. The small-diameter part 161d is set at a position near the one end 161a of the pinion shaft 161. The large-diameter fitting shaft 161e is set at a position far from the one end 161a of the pinion shaft 161.

Furthermore, the fitting shaft 161e has a jig catch 161k formed in the center of the axial direction. The jig catch 161k is a portion with which a jig comes into engagement, and the cross section of the shaft is formed into a noncircular shape when viewed from the side of the pinion shaft 161 with the one end 161a, as shown in FIGS. 8A and 8B. More specifically, the jig catch 161k is a portion that has flat surfaces 161l, 161l on the external peripheral surface of the fitting shaft 161e. A tool can reliably and stably engage with the jig catch 161k having a noncircular shaped cross section.

The jig catch 161f is formed between the fitting shaft 161e and the mid-supported part 161g. The jig catch 161f is formed into a noncircular shape in cross-section when viewed from the end 161a of the pinion shaft 161, as shown in FIGS. 8A and 8C. More specifically, the jig catch 161f is a portion that has flat surfaces 161m, 161m on the external peripheral surface. A tool can reliably and stably engage with the jig catch 161f having a noncircular shaped cross section.

The mid-supported part 161g has the same configuration as the mid-supported part 61g shown in FIG. 4A. The groove 161h for fitting a retaining ring has the same configuration as the groove 61h for fitting a retaining ring shown in FIG. 4A. The lower supported part 61l has the same configuration as the lower supported part 61i shown in FIG. 4A.

The first hollow shaft 162 has substantially the same configuration as the first hollow shaft 62 shown in FIG. 4A, and has a first magnetostrictive film 71 formed over the entire external peripheral surface. The second hollow shaft 163 has exactly the same configuration as the second hollow shaft 63 shown in FIG. 4A, and has a second magnetostrictive film 72 formed over the entire external peripheral surface. Consequently, the torque-side shaft 161 subjected to the action of external torque from the outside has the first and second magnetostrictive films 71, 72 on the surface.

The dimensions of the first and second hollow shafts 162, 163 of the modification are set to be equal to the dimensions of the second hollow shaft 63 shown in FIG. 4A. For example, the diameter of the first fitting hole 162a in the first hollow shaft 162 and the diameter of the second fitting hole 163a in the second hollow shaft 163 are equal to the diameter d2 of the second fitting hole 63a shown in FIG. 4A.

An interference fit is adopted both for the fit system of the fitting shaft 161e in the first fitting hole 162a, and for the fit system of the fitting shaft 161e in the second fitting hole 163a. Fitting the fitting shaft 161e into the first fitting hole 162a makes it possible to apply a constant load to the first hollow shaft 162 in the diameter direction. This load makes it possible to adjust dispersion in the magnetostrictive properties of the first magnetostrictive film 71. Similarly, fitting the fitting shaft 161e in the second fitting hole 163a makes it possible to apply a constant load to the second hollow shaft 163 in the diameter direction. This load makes it possible to adjust dispersion in the magnetostrictive properties of the second magnetostrictive film 72.

The procedure for assembling the pinion shaft 161 and the first and second hollow shafts 162, 163 is as follows. First, an end portion of the fitting shaft 161e, beginning with the one end 161a of the pinion shaft 161, is fitted (fixed in place by pressure fitting) in the first hollow shaft 162. Next, the other end portion of the fitting shaft 161e, beginning with the other end 161b of the pinion shaft 161, is fitted (fixed in place by pressure fitting) in the second hollow shaft 163. The operation of assembling the torque transmission shaft 124 is thereby complete. The result is shown in FIGS. 8D and 8E.

The first hollow shaft 162 and the second hollow shaft 163 are separated by a predetermined interval L2 in the axial direction of the pinion shaft 161. The torque transmission shaft 124 has a non-magnetostrictive portion in the interval L2 between the first magnetostrictive film 71 and the second magnetostrictive film 72. No magnetostrictive film is formed in the non-magnetostrictive portion.

Thus, in the step for forming the torque transmission shaft 124, the pinion shaft 161 is fitted separately into the first and second hollow shafts 162, 163 from the ends 161a, 161b. The same portion of the pinion shaft 161 is not fitted into the fitting holes 162a, 163a of the two hollow shafts 162, 163. Consequently, the fitted surface of the fitting shaft 161e and the fitted surfaces of the fitting holes 162a, 163a are not roughened. The fitting shaft 161e can be stably fitted into the fitting holes 162a, 163a, and the torque transmission shaft 124 can be assembled with greater precision. Smaller distances can be set for the distance over which the pinion shaft 161 is fitted up to a predetermined position in the first hollow shaft 162 and for the distance over which the pinion shaft 161 is fitted up to a predetermined position in the second hollow shaft 163. Therefore, ease of operation is enhanced because the pinion shaft 161 can be fitted up to predetermined positions in the hollow shafts 162, 163 in a short amount of time. Moreover, the torque transmission shaft 124 can be assembled with greater precision because the pinion shaft 161 can be fitted stably in the hollow shafts 162, 163.

The pinion shaft 161 and first and second hollow shafts 162, 163 assembled in this manner mutually restrict each other's relative rotation and relative axial movement. The steering torque transferred from the steering wheel 21 (see FIG. 1) to the pinion shaft 161 via the joining part 161c is also transmitted to the first and second hollow shafts 162, 163 via the pinion shaft 161.

The pinion shaft 161 is preferably made into a hollow shaft rather than a solid shaft in order to achieve light weight.

The method for forming the torque transmission shaft 124 of the modification is substantially the same as the manufacturing method shown in FIGS. 4A through 4E, FIGS. 6A through 6D, and FIG. 7, and is therefore not described.

Next, a torque transmission shaft 224 of a second embodiment will be described with reference to FIGS. 9A and 9B. FIG. 9A shows the cross-sectional structure of the torque transmission shaft 224 before the first and second magnetostrictive films 71, 72 are provided. FIG. 9B shows an external view of the torque transmission shaft 224 after the first and second magnetostrictive films 71, 72 have been provided.

The torque transmission shaft 224 of the second modification is substantially the same as the torque transmission shaft 24 shown in FIGS. 1 through 7. In other words, the torque transmission shaft 224 is used in place of the torque transmission shaft 24.

The torque transmission shaft 224 is comprised of a pinion shaft 261 (operating shaft 261), a first hollow shaft 262, and a second hollow shaft 263. The pinion shaft 261, the first hollow shaft 262, and the second hollow shaft 263 are configured from separate members and are arranged on the same axis (arranged on the axis CL of the torque transmission shaft 224).

Furthermore, the pinion shaft 261 and the first and second hollow shafts 262, 263 are assembled integrally by being fitted and fixed together (joined together). For example, the pinion shaft 261 and the first and second hollow shafts 262, 263 are assembled integrally by pressure fitting.

The pinion shaft 261 is comprised of a ferromagnetic material or another magnetic material. An example of a ferromagnetic material is steel (including nickel-chromium-molybdenum steel). Specifically, the pinion shaft 261 is a solid shaft in which a joining part 261c, a fitting shaft 261d, a flange 261f, a mid-supported part 261g, a groove 2161h for fitting a retaining ring, the pinion 32, and a lower supported part 261i are arranged in the indicated sequence along the axis CL from one end 261a of the axial direction to the other end 261b.

The joining part 261c, the fitting shaft 261d, the flange 261f, the mid-supported part 261g, the groove 2161h for fitting a retaining ring, the pinion 32, and the lower supported part 261i are formed integrally on the pinion shaft 261.

The following is a description of the parts of the pinion shaft 261, as contrasted with the pinion shaft 61 shown in FIGS. 4A through 4C. The joining part 261c has the same configuration as the joining part 61c shown in FIG. 4A. The fitting shaft 261d has the same configuration as the first fitting shaft 61d shown in FIG. 4A. The diameter D1 of the fitting shaft 261d is equal to the diameter of the first fitting shaft 61d. Furthermore, the fitting shaft 261d has a jig catch 261k formed in the middle of the axial direction. The jig catch 261k has the same configuration as the jig catch 61k shown in FIG. 4A.

The flange 261f has the same configuration as the flange 61f shown in FIG. 4A and is formed between the fitting shaft 261d and the mid-supported part 261g. The diameter of the flange 261f is greater than the diameter of the fitting shaft 261d or the diameter of the mid-supported part 261g. Furthermore, the flange 261f has flat surfaces 261m, 261m on the external peripheral surface. The flat surfaces 261m have the same configuration as the flat surfaces 61m, 61m shown in FIGS. 4A and 4C. Thus, the flange 261f, having a noncircular shaped cross section doubles as a jig catch.

The mid-supported part 261g has the same configuration as the mid-supported part 61g shown in FIG. 4A. The groove 2161h for fitting a retaining ring has the same configuration as the groove 61h for fitting a retaining ring shown in FIG. 4A. The lower supported part 261i has the same configuration as the lower supported part 61i shown in FIG. 4A.

The first and second hollow shafts 262, 263 are comprised of perfectly round, short pipes centered around the axis CL. The first and second hollow shafts 262, 263 have a length of L3. A fitting hole 262a (first fitting hole 262a) in the first hollow shaft 262, and a fitting hole 263a (second fitting hole 263a in the second hollow shaft 263, are perfectly round through-holes formed around the axis CL. The diameter d1 of the first and second fitting holes 262a, 263a is equal to the diameter of the first fitting hole 62a shown in FIG. 4A.

The first and second hollow shafts 262, 263 are integrally assembled by being fitted and fixed together (joined together) in the fitting shaft 261d. For example, the fitting shaft 261d and the first and second hollow shafts 262, 263 are integrally assembled by pressure fitting. The fit system of the fitting shaft 261d in the first and second fitting holes 262a, 263a is an "interference fit." Fitting the fitting shaft 261d into the first and second fitting holes 262a, 263a makes it possible to apply a constant load to the first and second hollow shafts 262, 263 in the diameter direction. This load makes it possible to adjust dispersion in the magnetostrictive properties of the first and second magnetostrictive films 71, 72.

The pinion shaft 261 and first and second hollow shafts 262, 263 assembled in this manner mutually restrict each other's relative rotation and relative axial movement. The steering torque transferred from the steering wheel 21 (see FIG. 1) to the pinion shaft 261 via the joining part 261c is also transmitted to the first and second hollow shafts 262, 263 via the pinion shaft 261.

The first magnetostrictive film 71 is formed over the entire external peripheral surface of the first hollow shaft 262. The second magnetostrictive film 72 is formed over the entire external peripheral surface of the second hollow shaft 263. The width L1 of the first and second magnetostrictive films 71, 72 is the same as in the first embodiment, and is less than the length L3 of the first and second hollow shafts 262, 263. Therefore, the external peripheral surfaces of the ends of the hollow shafts 262, 263 have portions in which the magnetostrictive films are not formed. Thus, the operating shaft 261 subjected to the action of external torque from the outside has the first magnetostrictive film 71 and the second magnetostrictive film 72 on the surface. The pinion shaft 261 has a non-magnetostrictive portion between the first hollow shaft 262 and the second hollow shaft 263. No magnetically insulated layers or magnetostrictive films are formed in the non-magnetostrictive portion. As described above, the jig catch 261k is formed in this non-magnetostrictive portion.

The first and second hollow shafts 262, 263 according to the second embodiment are comprised of a nonmagnetic material. This nonmagnetic material is a different metal material than the material of the pinion shaft 261 or the magnetostrictive films 71, 72, and contains an alloy. Specifically, the nonmagnetic material constituting the first and second hollow shafts 262, 263 is a metal having a higher melting point (fusing point) than the Curie temperature of the magnetostrictive films 71, 72, and is a good conductor. Examples of this type of metal material include copper (Cu), copper alloys, aluminum (Al), and aluminum alloys. The melting point of copper is about 1080° C., and the melting point of a copper alloy is equal to or greater than 1080° C. The melting point of aluminum is about 660° C., and the melting point of an aluminum alloy is equal to or greater than 660° C.

The Curie temperature of the Ni—Fe alloy film constituting the magnetostrictive films 71, 72 varies depending on the content of nickel (Ni). The Curie temperature of Ni is about 360° C. Generally, an Ni—Fe alloy film having an Ni content of 40 wt % is believed to have a Curie temperature of about 350° C., and an Ni—Fe alloy film having an Ni content of 50 wt % is believed to have a Curie temperature of about 550° C.

Consequently, suitable materials include copper, a copper alloy, aluminum, and an aluminum alloy having a sufficiently high melting point in relation to the Curie temperature of the Ni—Fe alloy film. For example, in cases in which the magnetostrictive films 71, 72 are configured from an Ni—Fe alloy film having a Curie temperature of 350 to 550° C., the first and second hollow shafts 262, 263 are preferably configured from copper, a copper alloy, aluminum, or an aluminum alloy.

Thus, the nonmagnetic material constituting the first and second hollow shafts 262, 263 is comprised of a metal having a higher melting point than the Curie temperature of the magnetostrictive films 71, 72. There is no concern that the first and second hollow shafts 262, 263 will melt even when the ambient temperature is increased to the Curie temperature of the magnetostrictive films 71, 72. Therefore, the magnetostrictive films 71, 72 can be reliably held tightly bonded to the pinion shaft 261 via the first and second hollow shafts 262, 263 even at high temperatures. Consequently, the magnetostrictive torque sensor 41 can exhibit adequate performance and is highly reliable even when used in comparatively high ambient temperatures. The magnetostrictive torque sensor 41 exhibits sufficient performance even in cases in which, e.g., the magnetostrictive torque sensor 41 is installed in a mobile unit such as an airplane, a large boat, an automobile, a forklift, or another vehicle.

Moreover, in cases in which the ambient temperature in which the magnetostrictive torque sensor 41 is used exceeds the Curie temperature of the magnetostrictive films, the only result is that the magnetism of the magnetostrictive films 71, 72 gradually dissipates. Changes in the magnetism of the magnetostrictive films 71, 72 can be detected by the sensor coils 76, 77 until the magnetism of the magnetostrictive films 71, 72 has markedly declined (see FIG. 3). Therefore, a failure in the magnetostrictive torque sensor 41 can be readily detected. Consequently, the reliability of the magnetostrictive torque sensor 41 can be greatly increased.

The first hollow shaft 262 is hereinafter referred to as the "first magnetically insulating layer 262" as appropriate. The second hollow shaft 263 is referred to as the "second magnetically insulating layer 263" as appropriate.

Figure 10:
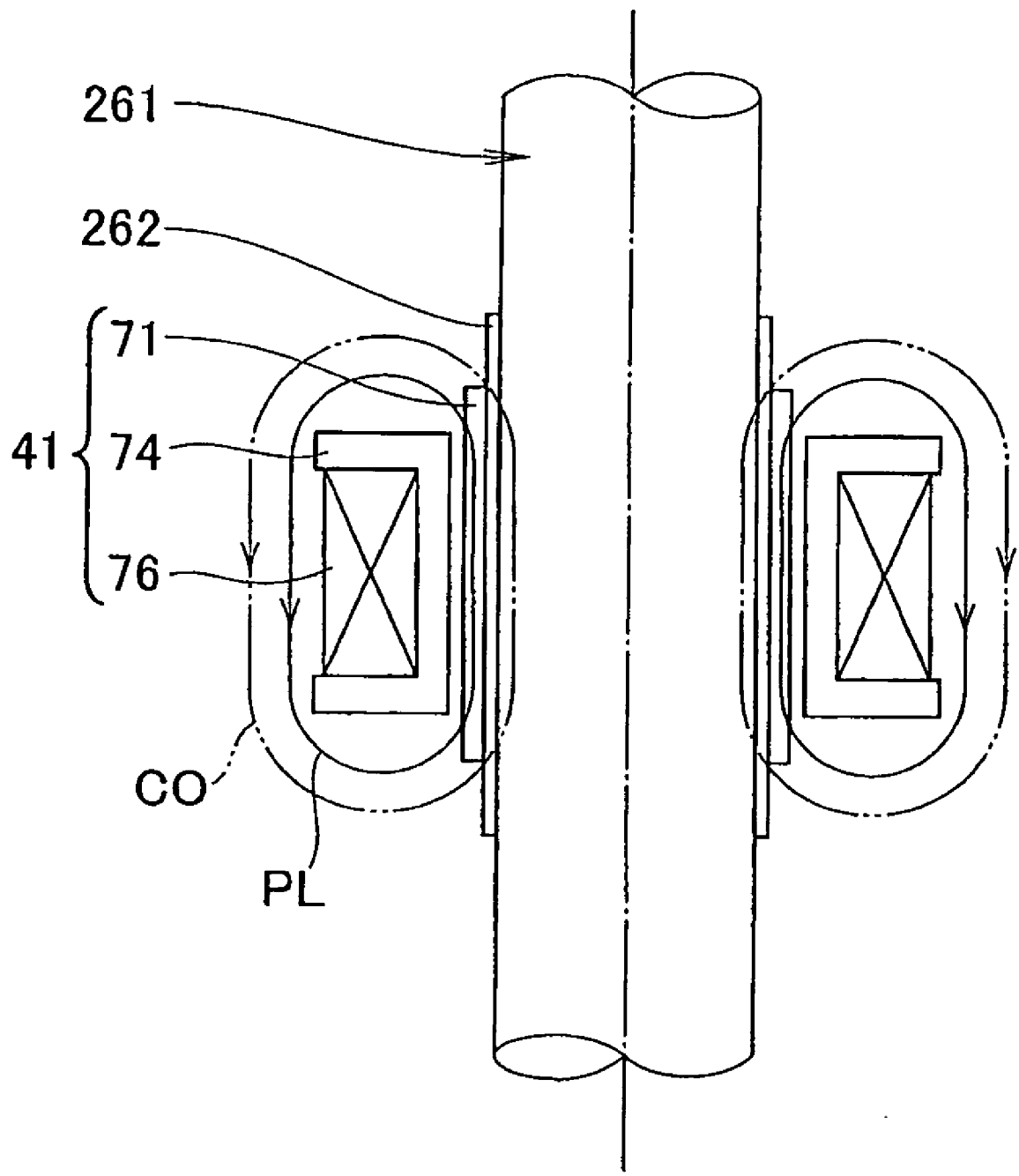
FIG. 10 is a schematic view illustrating an action resulting from providing a magnetic insulation layer between the pinion shaft and the magnetostrictive film shown in FIGS. 9A and 9B.

The following is a description, made with reference to FIG. 10, of the result of providing the magnetically insulating layers 262, 263 between the pinion shaft 261 and the magnetostrictive films 71, 72. In FIG. 10, the first magnetically insulating layer 262 and the first magnetostrictive film 71 are described as examples.

FIG. 10 corresponds to FIGS. 3 and 4B, and schematically depicts magnetic fluxes CO, PL created by an exciting coil (not shown) wound together with the sensor coil 76.

In FIG. 10, the imaginary line CO shows the magnetic flux in cases in which there is no magnetically insulating layer 262; i.e., in cases in which the magnetostrictive film 71 is formed directly on the external peripheral surface of the pinion shaft 261. In this case, the magnetic flux CO passes through the pinion shaft 261. Consequently, the magnetostrictive film 71 is susceptible to the magnetic effects of the pinion shaft 261. Moreover, the sensitivity of the magnetostrictive torque sensor 41 is reduced because the magnetic flux CO passes through the pinion shaft 261 and not the magnetostrictive film 71.

In the second embodiment, the magnetically insulating layer 262 is located between the pinion shaft 261 and the magnetostrictive film 71. The magnetic flux in this case is shown by the solid line PL. As described above, the magnetically insulating layer 262 is comprised of copper, a copper alloy, aluminum, or an aluminum alloy. The volume resistivity of copper is about $2 \times 10^{-8}$ $\Omega$m. The volume resistivity of aluminum is about $3 \times 10^{-8}$ $\Omega$m.

The volume resistivity values of copper and aluminum are fairly low in contrast to the Ni—Fe alloy film constituting the magnetostrictive film 71, in which the volume resistivity of nickel (Ni) is about $7 \times 10^{-8}$ $\Omega$m, and the volume resistivity of iron (Fe) is about $10 \times 10^{-8}$ $\Omega$m. In other words, the volume resistivity of the magnetically insulating layer 262 is fairly low in relation to the volume resistivity of the magnetostrictive film 71.

If an attempt is made to pass the magnetic flux PL shown by the solid line through the magnetically insulating layer 262, an eddy current will be created around the magnetic flux PL. The magnetic flux PL cannot pass through the magnetically insulating layer 262 if a larger eddy current does not flow with a reduction in the volume resistivity of the magnetically insulating layer 262. Ultimately, since the magnetic flux PL cannot pass through the magnetically insulating layer 262, the flux cannot pass through the pinion shaft 261 either. Consequently, the magnetostrictive film 71 does not receive the magnetic effects of the pinion shaft 261.

Furthermore, since the magnetic flux PL cannot pass through the pinion shaft 261, the magnetic flux PL passes in a proportionately greater amount through the magnetostrictive film 71. Moreover, the magnetic flux PL circles a short distance around the sensor coil 76. As a result, the sensitivity of the magnetostrictive torque sensor 41 increases further.

As is clear from the above description, the magnetostrictive film 71 is not susceptible to the magnetic effects of the pinion shaft 261. This is achieved despite the simple configuration in which merely the magnetically insulating layer 262 is provided between the pinion shaft 261 and the magnetostrictive film 71. The quality of the magnetostrictive film 71 can be stabilized because the magnetostrictive film 71 can be provided uniformly and with better adhesion around the entire periphery of the pinion shaft 261 via the magnetically insulating layer 262. Moreover, since the magnetically insulating layer 262 is merely provided between the pinion shaft 261 and the magnetostrictive film 71, the magnetostrictive film 71 is easily manufactured and manufacturing costs can be reduced.

By thus interposing the magnetically insulating layers 262, 263, which are formed from a nonmagnetic material, between the outer peripheral surface of the pinion shaft (operating shaft) 261 and the respective magnetostrictive films 71, 72, it becomes possible to magnetically insulate the pinion shaft 261 and the magnetostrictive films 71, 72 from each other. As a result, even when the pinion shaft 261 is magnetized, the magnetostrictive films 71, 72 can remain uninfluenced by the magnetism of the pinion shaft 261. Again, the films 71, 72 would not be influenced by the magnetism being present around the magnetostrictive torque sensor 41 via the pinion shaft 261. Consequently, it becomes possible to significantly enhance the sensitivity and stability of the magnetostrictive characteristics of the magnetostrictive films 71, 72. This further leads to the advantage that a detection signal can be obtained from the magnetostrictive torque sensor 41 with increased precision and stability. When deciding materials, shapes and dimensions of the pinion shaft 261, no care may be taken to magnetic influences from the pinion shaft 261 to the magnetostrictive films 71, 72. This provides an increased level of freedom of designing the magnetostrictive torque sensor 41.

The method for forming the torque transmission shaft 224 according to the second embodiment is substantially the same as the manufacturing method shown in FIGS. 4A through 4E, FIGS. 6A through 6D, and FIG. 7, and is therefore not described.

Next, a modification of the second embodiment will be described with reference to FIGS. 11A and 11B. The torque transmission shaft 224 according to the modification of the second embodiment is substantially the same as the torque transmission shaft 224 shown in FIG. 9B.

FIG. 11A shows the cross-sectional structure of the torque transmission shaft 224 before the first and second magnetostrictive films 71, 72 are provided. FIG. 11B shows an external view of the torque transmission shaft 224 after the first and second magnetostrictive films 71, 72 have been provided.

The torque transmission shaft 224 of the modification has a configuration in which the first and second hollow shafts 262, 263, having been provided with the magnetostrictive films 71, 72, are fitted and fixed in place to the pinion shaft 261, as shown in FIGS. 11A and 11B. The configuration and operation are otherwise similar to the second embodiment shown in FIGS. 9A and 9B, and are therefore denoted by the same symbols and are not described.

In the modification, the procedure for providing the magnetostrictive films 71, 72 to the first and second hollow shafts 262, 263 is as follows. First, the pinion shaft 261 and the first and second hollow shafts 262, 263 are prepared as shown in FIG. 1A. Next, the magnetostrictive films 71, 72 are formed by plating or the like on the external peripheral surfaces of the first and second hollow shafts 262, 263. Lastly, the first and second hollow shafts 262, 263 are fitted and fixed in place at a predetermined location on the fitting shaft 261*d*, completing the operation, as shown in FIG. 11A.

The method for forming the torque transmission shaft 224 of the modification is substantially the same as the manufacturing method shown in FIGS. 4A through 4E, FIGS. 6A through 6D, and FIG. 7, and is therefore not described.

Next, a torque transmission shaft 324 of a third embodiment will be described in detail with reference to FIGS. 12A and 12B. FIG. 12A shows the cross-sectional structure of the torque transmission shaft 324 in a state in which the first and second magnetostrictive films 71, 72 have been provided. FIG. 12B shows an external view of the torque transmission shaft 324 in a state in which the first and second magnetostrictive films 71, 72 have been provided.

The torque transmission shaft 324 of the third embodiment has first and second magnetically insulating layers 362, 363 formed on the fitting shaft 261*d*. The first magnetically insulating layer 362 is provided in place of the first hollow shaft 262 (first magnetically insulating layer 262) shown in FIGS. 9A and 9B. The second magnetically insulating layer 363 is provided in place of the second hollow shaft 263 (second magnetically insulating layer 263) shown in FIGS. 9A and 9B. The material of the magnetically insulating layers 362, 363 is the same as the material of the hollow shafts 262, 263. The width L3 of the magnetically insulating layers 362, 363 is the same as the length of the hollow shafts 262, 263.

Thus, the torque transmission shaft 324 of the third embodiment is comprised of the pinion shaft 261 (operating shaft 261) and the first and second magnetically insulating layers 362, 363. The pinion shaft 261 has the same configuration as the pinion shaft 261 shown in FIGS. 9A and 9B. In the third embodiment, the fitting shaft 261*d* may be alternatively referred to as the "magnetostrictive film placement part 261*d*" as appropriate.

As is clear from the above description, the magnetostrictive film placement part 261*d* has two magnetically insulating layers 362, 363 formed on the external peripheral surface at a predetermined position in the axial direction. The first and second magnetically insulating layers 362, 363 are films that are formed on the external peripheral surface of the pinion shaft 261 by, e.g., plating, thermal spraying, sputtering, vapor deposition, or another method. The thickness of these films 362, 363 (magnetically insulating layers 362, 363) is constant. The thickness is preferably about 5 to 500 μm. The thickness of the films 362, 363 may be less than 5 to 500 μm or greater than 5 to 500 μm.

The first magnetostrictive film 71 is provided on the external peripheral surface of the first magnetically insulating layer 362. The second magnetostrictive film 72 is provided on the external peripheral surface of the second magnetically insulating layer 363. The two magnetostrictive films 71, 72 are the same as the magnetostrictive films 71, 72 shown in FIGS. 4A through E, and are formed by, e.g., vapor-phase plating on the external peripheral surfaces of the magnetically insulating layers 362, 363. Thus, the first magnetostrictive film 71 is provided via the first magnetically insulating layer 362, and the second magnetostrictive film 72 is provided via the second magnetically insulating layer 363 on the surface of the pinion shaft 261 on which torque acts from the outside.

As described above, the two magnetically insulating layers 362, 363 comprise films having a generally constant width L3 and a constant thickness, and are formed around the entire external peripheral surface of the pinion shaft 261. The first and second magnetostrictive films 71, 72 are comprised of layers having a generally constant width L1 and a constant thickness, and are formed around the entire external peripheral surfaces of the first and second magnetically insulating layers 362, 363.

Because the magnetically insulating layers 362, 363 can be formed easily on the external peripheral surface of the pinion shaft 261, the cost of production of the magnetostrictive torque sensor 41 (see FIG. 3) can be reduce substantially. Further, because the magnetically insulating layers 362, 363 comprise the films, they can be adhered firmly to the outer peripheral surface of the pinion shaft 261 and formed to extend all around the pinion shaft 261. Since the magnetically insulating layers 362, 363 can be formed to have a uniform thickness, their magnetically insulating properties can be made more stable. As a result, the magnetostrictive films 71, 72 are rendered to exhibit increased sensitivity and stability in magnetostrictive properties thereof.

The following is a description of the method for manufacturing the magnetostrictive torque sensor 41 of the third embodiment, and particularly of the method for forming the torque transmission shaft 324. The torque transmission shaft 324 is manufactured according to the steps shown in FIGS. 12A and 12B, FIGS. 6A through 6D, and FIG. 7.

In the method for forming the torque transmission shaft 324, first the pinion shaft 261 is prepared, having formed thereon the magnetically insulating layers 362, 363 and the magnetostrictive films 71, 72, as shown in FIG. 12A (shaft preparation step). The subsequent steps are substantially the same as the manufacturing method shown in FIGS. 6A through 6D and FIG. 7 and are therefore not described.

After it is applied with a masking at portions where the films 362, 363 are not formed, the pinion shaft 261 is put into a plating bath, whereby the films 362, 363 are formed on predetermined portions of the pinion shaft 261.

In the modification of the second embodiment, shown in FIGS. 11A and 1B, magnetically insulating layers 262, 263 comprise pipes. Thus, it is not necessary for the pinion shaft 261 to be masked and put into a plating bath. This enables the rotating shaft 24 to avoid being influenced by being put into a plating bath.

As described above, in the second embodiment shown in FIGS. 9A and 9B and in modification shown in FIGS. 11A and 11B, the magnetically insulating layers 262, 263 comprise the hollow shafts (pipes) fitted in and fixed to the pinion shaft (operating shaft) 261.

As a result, dimension management of the magnetically insulating layers 262, 263 upon production thereof becomes easy. The magnetically insulating layers 262, 263 can be easily formed to have a uniform thickness. By virtue of the uniform thickness, the magnetically insulating layers 262, 263 are rendered to exhibit magnetic properties with increased stability. This enables the magnetostrictive films 71, 72 to exhibit magnetostrictive properties with increased sensitivity and stability. Further, because the magnetically insulating layers 262, 263 are formed by the pipes fitted in and fixed to the operating shaft 261, it becomes possible to select one of the first and second arrangements, as explained below, so as to achieve performance required of the magnetostrictive torque sensor 41. The first arrangement comprises forming the magnetostrictive films 71, 72 on the pipes after the pipes are fitted into the operating shaft 261, as shown in FIGS. 9A and 9B. The second arrangement comprises forming the magnetostrictive films 71, 72 on the pipes first and then fitting the pipes into the operating shaft 261, as shown in FIGS. 11A and 11B. In a stage of designing the magnetostrictive torque sensor 41, a more appropriate one of the two arrangements may be chosen in accordance with a required thickness and material of the pipes. This makes it possible to design the magnetostrictive torque sensor 41 with increased freedom.

In the present invention, the torque transmission shafts 24, 124, 224 can be manufactured by fitting and fixing the operating shafts 61, 161, 261 into the first hollow shafts 62, 162, 262 and the second hollow shafts 63, 163, 263 in the step for forming the torque transmission shafts 24, 124, 224. For example, instead of being joined by pressure fitting alone, the operating shafts 61, 161, 261 may be fitted into the first hollow shafts 62, 162, 262 and the second hollow shafts 63, 163, 263, and these components may then be fixed in place to each other by pins or screws.

In the present invention, the magnetostrictive films 71, 72 can be ferromagnetic films, and are not limited to Ni—Fe alloy films. For example, the magnetostrictive films 71, 72 may be Co—Fe alloy films or Sm—Fe alloy films.

In the third embodiment illustrated in FIGS. 12A and 12B, the magnetically insulating layers 362, 363 may be disposed on the operating shaft 262 continuously along the length thereof.

The magnetostrictive torque sensor 41 of the present invention is suitable for use as a torque sensor provided to an electric power steering apparatus for a vehicle.

Obviously, various minor changes and modifications of the present invention are possible in light of the above teaching. It is therefore to be understood that within the scope of the appended claims the invention may be practiced otherwise than as specifically described.

What is claimed is:

1. A magnetostrictive torque sensor for detecting a torque, said magnetostrictive torque sensor comprising:
   an operating shaft adapted to be applied with an external torque;
   a first hollow shaft and a second hollow shaft that are each individually fixedly press-fitted to the operating shaft, wherein each of the first and second hollow shafts is an annular member which is formed separately and independently from the operating shaft;
   a first magnetostrictive film formed by plating on an external peripheral surface of the first hollow shaft; and
   a second magnetostrictive film formed by plating on an external peripheral surface of the second hollow shaft;
   wherein the first and second magnetostrictive films are heat treated after the first and second hollow shafts having the first and second magnetostrictive films formed thereon have been press-fitted to the operating shaft to induce creep which reduces residual strain created during the press-fitting.

2. The sensor of claim 1, wherein the first hollow shaft has a first fitting hole formed therein having a first inside diameter, and the second hollow shaft has a second fitting hole formed therein having a second inside diameter which is larger than the first inside diameter of the first hollow shaft, and
   wherein the operating shaft has a first fitting shaft portion which is press-fitted in the first fitting hole of the first hollow shaft, and a second fitting shaft portion which is press-fitted in the second fitting hole in the second hollow shaft,
   the first fitting shaft portion having a first outside diameter selected to fit inside of the first fitting hole with an interference fit, and the second fitting shaft portion having a second outside diameter larger than the first outside diameter and selected to fit inside of the second fitting hole with an interference fit.

3. The sensor of claim 1, wherein the operating shaft comprises:
a first fitting shaft portion having a first outside diameter, a second fitting shaft portion having a second outside diameter, and a medial portion intermediate said first and second fitting shaft portions, the medial portion having a diameter set to be slightly larger than either of the respective first and second outside diameters, wherein the first and second outside diameters are selected so as to allow the first and second hollow shafts to be respectively fitted over opposite ends of the operating shaft.

4. The sensor of claim 1, wherein each of the first and second hollow shafts has a wall thickness larger than respective wall thicknesses of the first and second magnetostrictive films.

5. The magnetostrictive torque sensor of claim 1, wherein a portion of the operating shaft has first and second flat surfaces formed on an external peripheral surface thereof for engagement by a jig.

6. The magnetostrictive torque sensor of claim 1, wherein the first hollow shaft has an outside diameter which is substantially equal to an outside diameter of the second hollow shaft.

7. The magnetostrictive torque sensor of claim 1, wherein while the first and second magnetostrictive films are being heat treated a predetermined torque is applied to the operating shaft so as to apply the torque to the first and second magnetostrictive films.

8. A method for manufacturing a magnetostrictive torque sensor comprising a first magnetostrictive film and a second magnetostrictive film disposed on a surface of a torque transmission shaft adapted to be applied with an external torque, the method comprising the steps of:
providing a first hollow shaft having a first fitting hole formed therein and plating the first magnetostrictive film on an external peripheral surface thereof;
providing a second hollow shaft having a second fitting hole formed therein and plating the second magnetostrictive film on an external peripheral surface thereof;
providing an operating shaft which is separate and independent from said first and second hollow shafts;
forming the torque transmission shaft by press-fitting and fixing a first fitting shaft portion of the operating shaft into the first fitting hole formed in the first hollow shaft to create an interference fit therebetween, and by press-fitting and fixing a second fitting shaft portion of the operating shaft into the second fitting hole formed in the second hollow shaft to create an interference fit therebetween;
applying a predetermined torque to the operating shaft so as to apply the torque to the first and second magnetostrictive films;
heating the first and second magnetostrictive films for a given period of time while the torque is being applied to the films;
cooling the heated first and second magnetostrictive films; and
terminating application of the torque to the magnetostrictive films so as to induce creep in the first and second magnetostrictive films which reduces residual strain created in the films during the press-fitting of the first and second hollow shafts onto the operating shaft.

9. The method according to claim 8, wherein the first hollow shaft has a first fitting hole formed therein having a first inside diameter, the second hollow shaft has a second fitting hole formed therein having a second inside diameter which is larger than the first inside diameter, the first fitting shaft portion having a first outside diameter selected to fit inside of the first fitting hole with an interference fit, and the second fitting shaft portion having a second outside diameter larger than the first outside diameter and selected to fit inside of the second fitting hole with an interference fit.

10. An electric power steering system comprising:
a torque transmission shaft comprising an operating shaft having a pinion integrally formed at one end thereof;
a rack shaft comprising a rack in which the pinion engages and a ball screw mechanism;
a housing which surrounds major portions of the torque transmission shaft and the rack shaft; and
a magnetostrictive torque sensor operatively associated with the torque transmission shaft, the torque sensor comprising:
a first hollow shaft and a second hollow shaft that are individually fixedly fitted to the operating shaft, wherein each of the first and second hollow shafts is an annular member which is formed separately and independently from the operating shaft and which is coaxial therewith;
a first magnetostrictive film formed by plating on an external peripheral surface of the first hollow shaft; and
a second magnetostrictive film formed by plating on an external peripheral surface of the second hollow shaft;
wherein the first and second hollow shafts having the first and second magnetostrictive films formed thereon are press-fitted to the operating shaft, and thereafter the first and second magnetostrictive films are heat treated to induce creep which reduces residual strain created during the press-fitting.

11. The electric power steering system of claim 10, wherein the first hollow shaft has a first fitting hole formed therein having a first inside diameter, and the second hollow shaft has a second fitting hole formed therein having a second inside diameter which is larger than the first inside diameter, and
wherein the operating shaft has a first fitting shaft portion which is press-fitted in the first fitting hole of the first hollow shaft, and a second fitting shaft portion which is press-fitted in the second fitting hole in the second hollow shaft,
the first fitting shaft portion having a first outside diameter selected to fit inside of the first fitting hole with an interference fit, and the second fitting shaft portion having a second outside diameter larger than the first outside diameter and selected to fit inside of the second fitting hole with an interference fit.

12. The electric power steering system of claim 10, wherein the operating shaft comprises a first fitting shaft portion having a first outside diameter, a second fitting shaft portion having a second outside diameter, and a medial portion intermediate said first and second fitting shaft portions, the medial portion having a diameter set to be slightly larger than either of the respective first and second outside diameters, wherein the first and second outside diameters are selected so as to allow the first and second hollow shafts to be respectively fitted over opposite ends of the operating shaft.

13. The electric power steering system of claim 10, wherein the first and second hollow shafts each has a wall width larger than respective wall widths of the first and second magnetostrictive films.

14. The electric power steering system of claim 10, further comprising a sensor unit comprising:
- a first pickup comprising a first coil bobbin and a first multilayer solenoid-winding sensor coil wrapped around the first coil bobbin and operatively associated with the first hollow shaft,
- a second pickup comprising a second coil bobbin and a second multilayer solenoid-winding sensor coil wound around the second coil bobbin and operatively associated with the second hollow shaft; and
- a magnetically shielding back yoke that encircles the first and second multilayer solenoid-winding sensor coils;

the sensor unit having first and second conversion circuits associated with the first and second pickups and wherein each respective conversion circuit rectifies, amplifies and converts a signal from the first and second pickups and outputs the results as detected voltages, and a torque output circuit uses the detected voltages to calculate a torque sensing voltage.

15. The electric power steering system of claim 10, wherein while the first and second magnetostrictive films are being heat treated a predetermined torque is applied to the operating shaft so as to apply the torque to the first and second magnetostrictive films.

* * * * *